US011724782B2

(12) United States Patent
Tulli

(10) Patent No.: US 11,724,782 B2
(45) Date of Patent: Aug. 15, 2023

(54) WATERCRAFT ACCESSORY

(71) Applicant: Paul A. Tulli, Ringwood, NJ (US)

(72) Inventor: Paul A. Tulli, Ringwood, NJ (US)

( * ) Notice: Subject to any disclaimer, the term of this patent is extended or adjusted under 35 U.S.C. 154(b) by 145 days.

(21) Appl. No.: 17/220,480

(22) Filed: Apr. 1, 2021

(65) Prior Publication Data
US 2021/0309324 A1    Oct. 7, 2021

Related U.S. Application Data

(60) Provisional application No. 63/003,616, filed on Apr. 1, 2020.

(51) Int. Cl.
*B63B 34/26* (2020.01)
*A01K 97/10* (2006.01)
*B63B 29/04* (2006.01)

(52) U.S. Cl.
CPC .............. *B63B 34/26* (2020.02); *A01K 97/10* (2013.01); *B63B 29/04* (2013.01); *B63B 2029/043* (2013.01)

(58) Field of Classification Search
CPC ................................. B63B 34/26; B63B 29/04
See application file for complete search history.

(56) References Cited

U.S. PATENT DOCUMENTS

| | | | | | |
|---|---|---|---|---|---|
| 3,958,289 | A | * | 5/1976 | Carlson | B63B 25/00 114/364 |
| 5,243,928 | A | * | 9/1993 | Brenaman | B63B 34/26 224/406 |
| 6,050,213 | A | * | 4/2000 | Stevens | B63B 17/00 114/364 |
| 6,755,145 | B2 | * | 6/2004 | Bolebruch | B63B 34/26 114/347 |
| 6,964,243 | B1 | * | 11/2005 | Thompson | B63B 34/20 114/347 |
| 7,146,927 | B1 | * | 12/2006 | Wright | A01K 97/06 114/364 |
| 9,586,657 | B1 | * | 3/2017 | Dykes | A47B 3/10 |
| 9,994,293 | B2 | * | 6/2018 | Johnson | B63H 16/04 |
| 10,793,233 | B1 | * | 10/2020 | Morgan | B63C 11/26 |

* cited by examiner

*Primary Examiner* — S. Joseph Morano
*Assistant Examiner* — Jovon E Hayes
(74) *Attorney, Agent, or Firm* — Pearne & Gordon LLP

(57) ABSTRACT

An accessory for providing storage for a watercraft includes a base extending in a longitudinal direction having an upper side, a lower side, a front side, a rear side, a left side, and a right side and a plurality of mounting rails extending along a perimeter of the upper side of the base along the front side, the rear side, the left side, and rear side thereof. The mounting rails project from the upper side of the base thereby defining a recessed platform space therebetween.

17 Claims, 43 Drawing Sheets

WATERCRAFT ACCESSORY

CROSS REFERENCE TO RELATED APPLICATION

This application claims the benefit of U.S. provisional patent application 63/003,616 entitled Boat Accessory and filed on Apr. 1, 2020.

FIELD OF THE INVENTION

The following description relates generally to an accessory for a watercraft.

BACKGROUND

Kayaking has become a popular recreational activity. While kayaking, it desirable for a kayaker to have access to some belongings, such as beverages, cameras, or cell phones. Typically, a kayaker is required to utilize storage compartments that are molded into the kayak, which are often out of reach while actively operating the kayak. If a kayaker wants constant access to their belongings, they must precariously store them in a dry bag within the inside of the kayak cockpit. The interior cockpit of a kayak is characteristically very tight in space, often forcing valuables to be kept in the lap of a user, between their legs, or alongside their hips. This frequently causes the belongings to shift and move around the inside the kayak, ultimately out of reach. In addition to the inconvenience, storing belongings in an unsecured compartment does not provide sufficient protection, but instead, creates a risk of losing them in the water. Furthermore, if a kayaker chooses to go fishing, the fishing rod mounts in a standard kayak are usually in awkward locations. Kayaking is a challenging activity, requiring constant balance and in most cases, both hands. Therefore, there is a need for a convenient storage system that allows the active sportsperson to get the most out of the kayaking experience.

SUMMARY

Disclosed herein is an accessory for a watercraft designed to address the lack of storage and usability while operating the watercraft. The kayak accessory provides ease of use that reduces distraction and allows the user to focus more on the operation of the watercraft. The system is designed to give the user both guidance and storage, to maximize both safety and accessible cargo. It will safely store valuables in watertight compartments, while also providing ample room for marine and electronic accessories.

DRAWINGS

Throughout the drawings and the detailed description, unless otherwise described, the same drawing reference numerals can be understood to refer to the same elements, features, and structures. The relative size and depiction of these elements may be exaggerated for clarity, illustration, and convenience.

DETAILED DESCRIPTION

Figure 1:
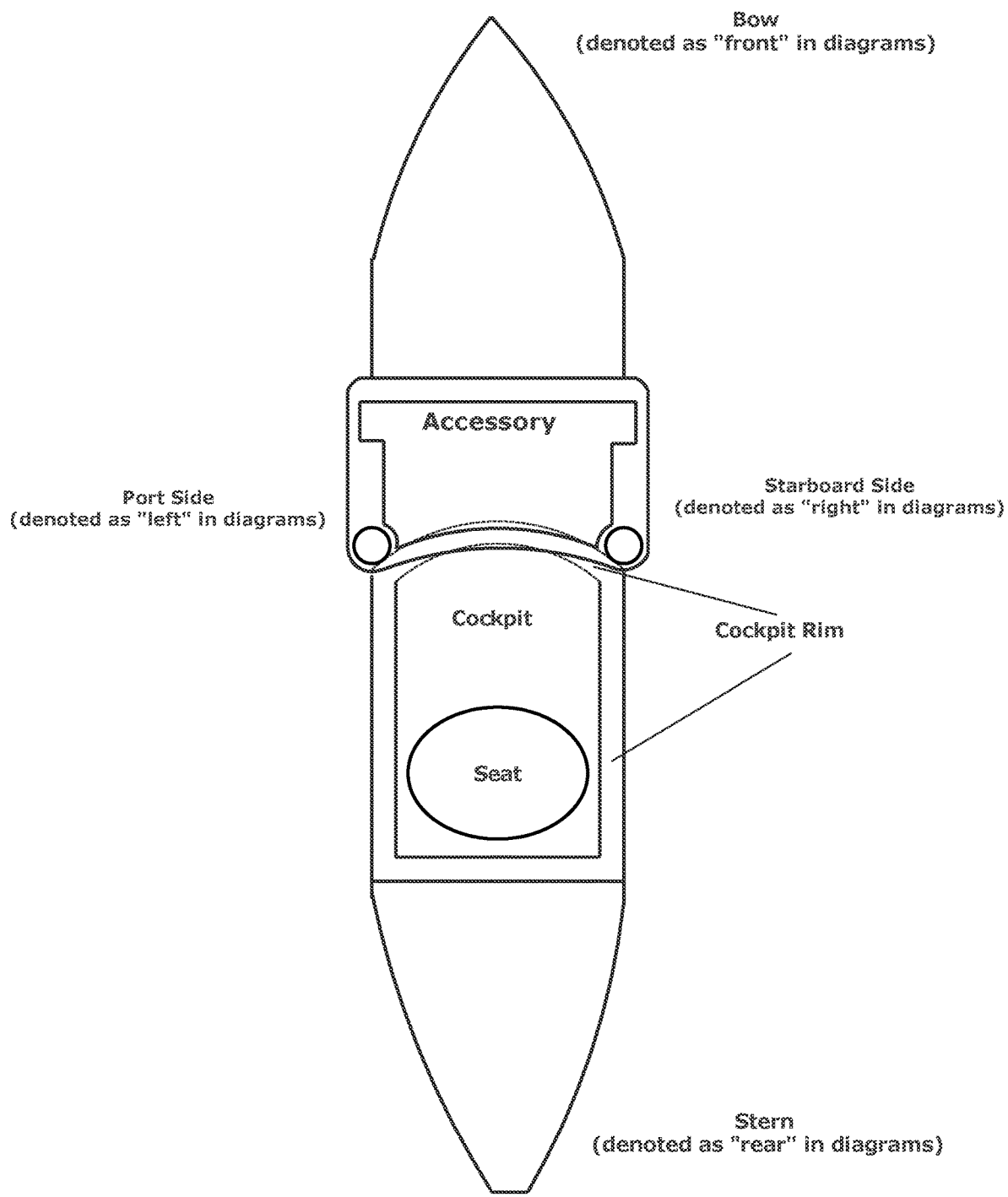
FIG. 1 illustrates an top view of a watercraft with an exemplary accessory as described herein.

Example embodiments are described and illustrated herein. These illustrated examples are not intended to be a limitation on the present embodiments. For example, one or more aspects of the system can be utilized in other embodiments and other types of watercraft or other vehicles. Such systems may, however, be embodied in many different forms and should not be construed as limited to the embodiments set forth herein. Like, but not necessarily the same, elements in the various figures are denoted by like reference numerals for consistency. Terms such as "first," "second," "front," and "rear" are used merely to distinguish one component (or part of a component or state of a component) from another. Such terms are not intended to denote a preference or a particular orientation.

Referring to FIG. 1, an example watercraft fitted with an accessory is depicted. For ease of description, the example watercraft is illustrated as and referred to herein as a kayak or a canoe. However, it is to be appreciated that the same or similar accessory can be used in connection with other watercraft, such as small boats, rafts, and the like. As shown in FIG. 1, the kayak includes a cockpit having a seat for receiving a user. The kayak accessory is positioned in front of the cockpit. This allows a user seated in the cockpit to see items connected to and/or stored on the accessory, as well as to have access to these items.

Figure 2:
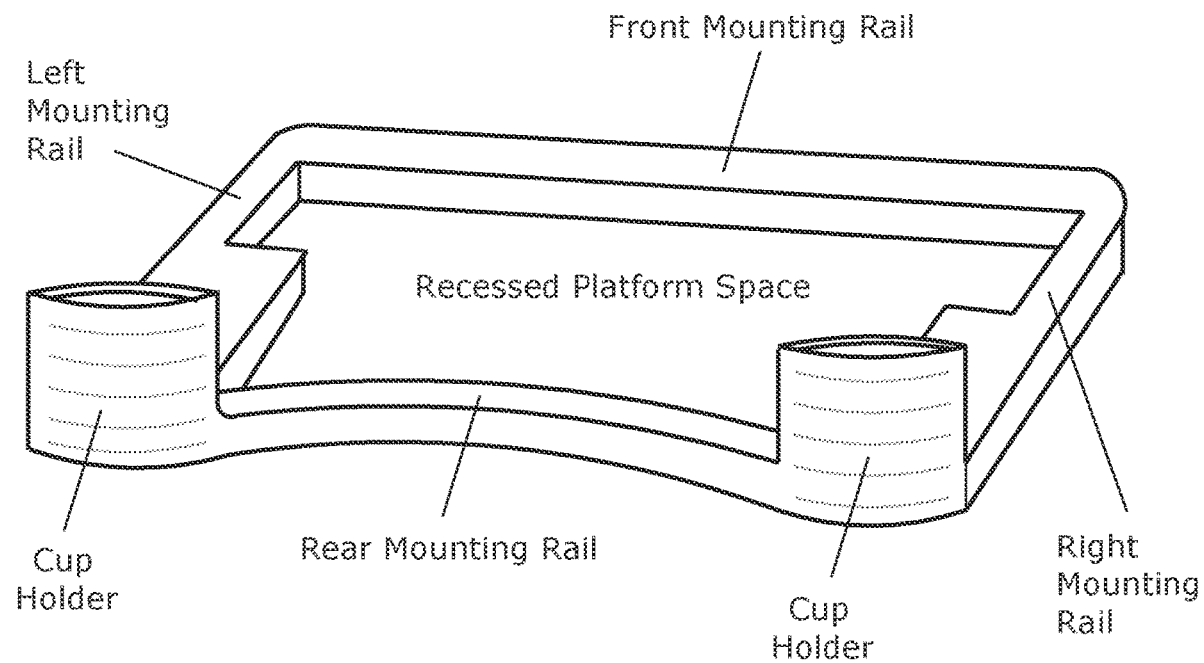
FIG. 2 illustrates a perspective view of an accessory in accordance with an example embodiment.
Figure 3:
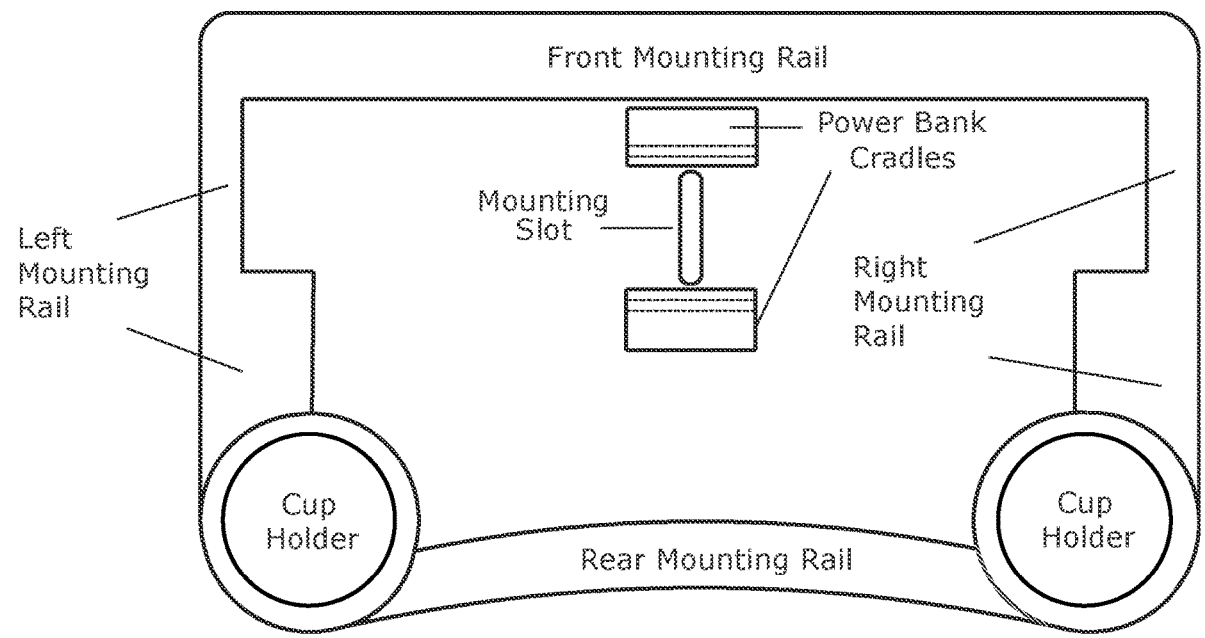
FIG. 3 illustrates a top view of an accessory in accordance with an example embodiment.

Referring to FIGS. 2-3, a general profile of the base of the kayak accessory is depicted. As can be seen, the base includes raised mounting rails, including a front mounting rail, a left mounting rail, a right mounting rail, and a rear mounting rail. The mounting rails together define a recessed platform space. The base also includes two cup holders configured to define receiving spaces that can receive items, e.g. bottles, cans, or cups.

Referring to FIG. 3, the kayak accessory includes a mounting slot configured to assist in connecting the kayak accessory to the kayak, as discussed further below. The kayak accessory includes power bank cradles on opposing sides of the mounting slot. These power bank cradles are configured to assist in supporting a power bank, as discussed further below.

Figure 4:
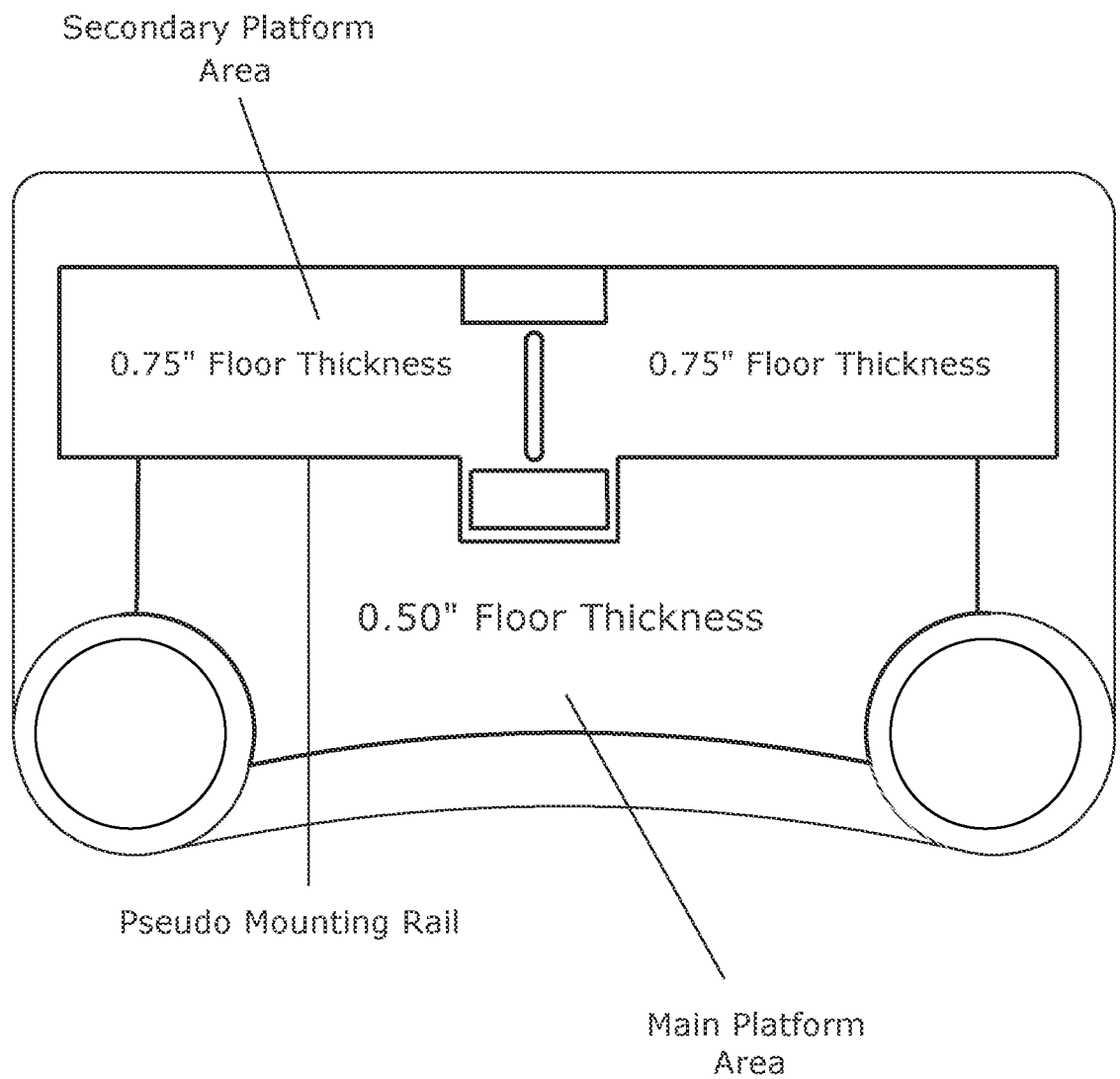
FIG. 4 illustrates a top view of an accessory in accordance with an example embodiment.
Figure 10:
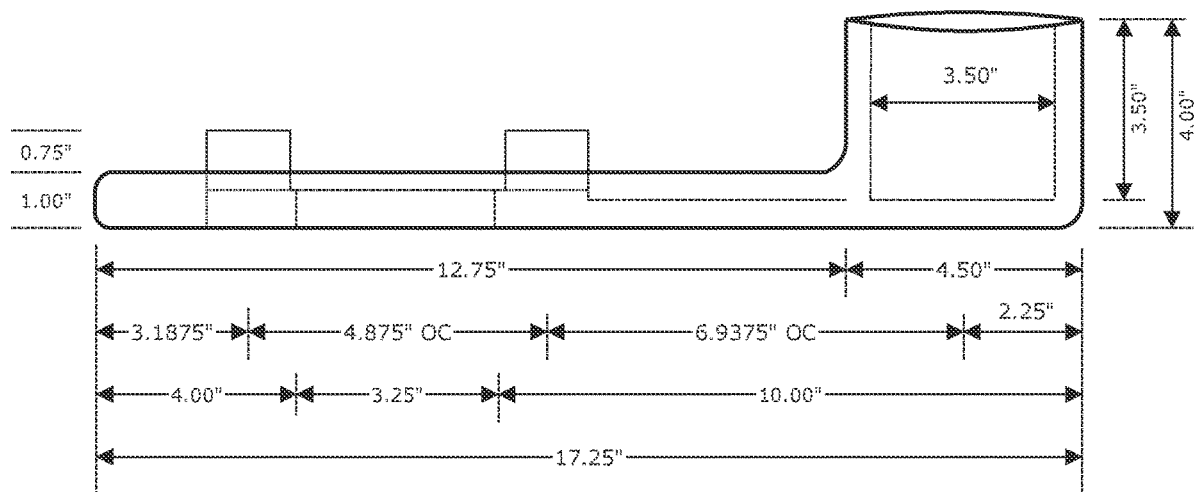
FIG. 10 illustrates a left side view of an accessory in accordance with an example embodiment.
Figure 11:
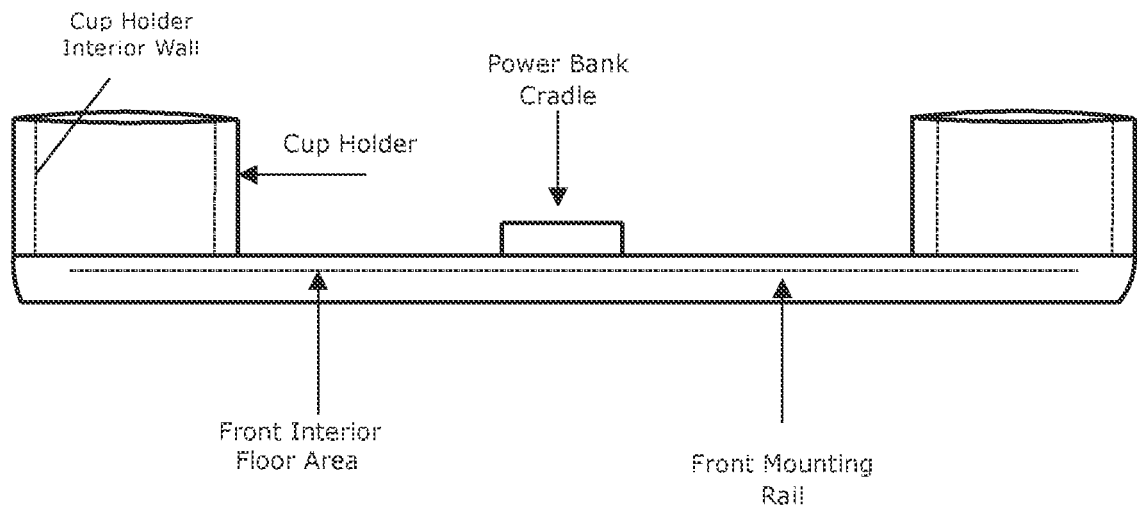
FIG. 11 illustrates a front view of an accessory in accordance with an example embodiment.
Figure 12:
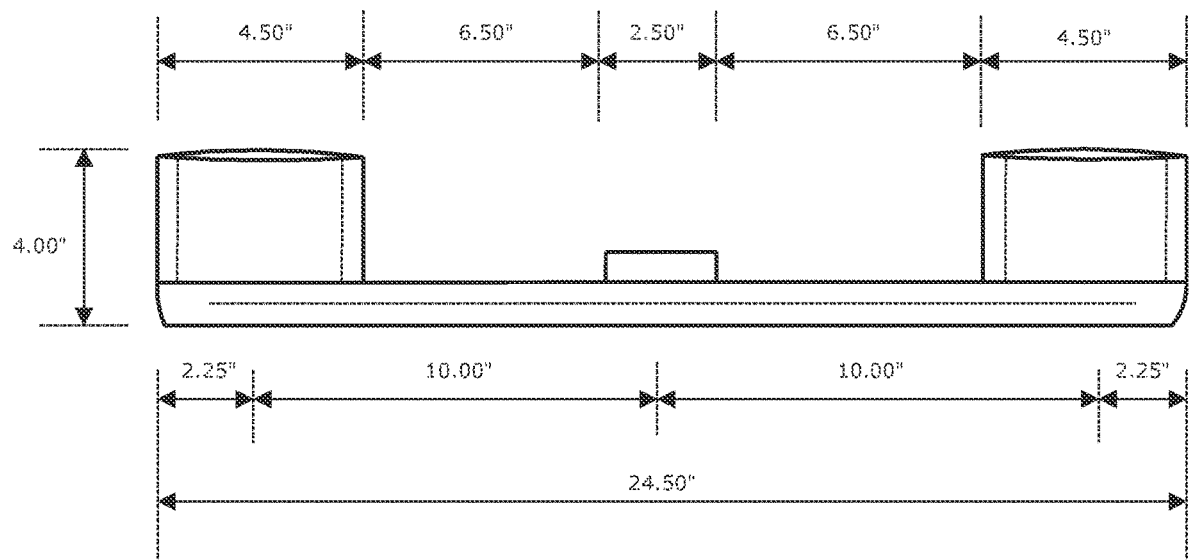
FIG. 12 illustrates a front view of an accessory in accordance with an example embodiment.
Figure 13:
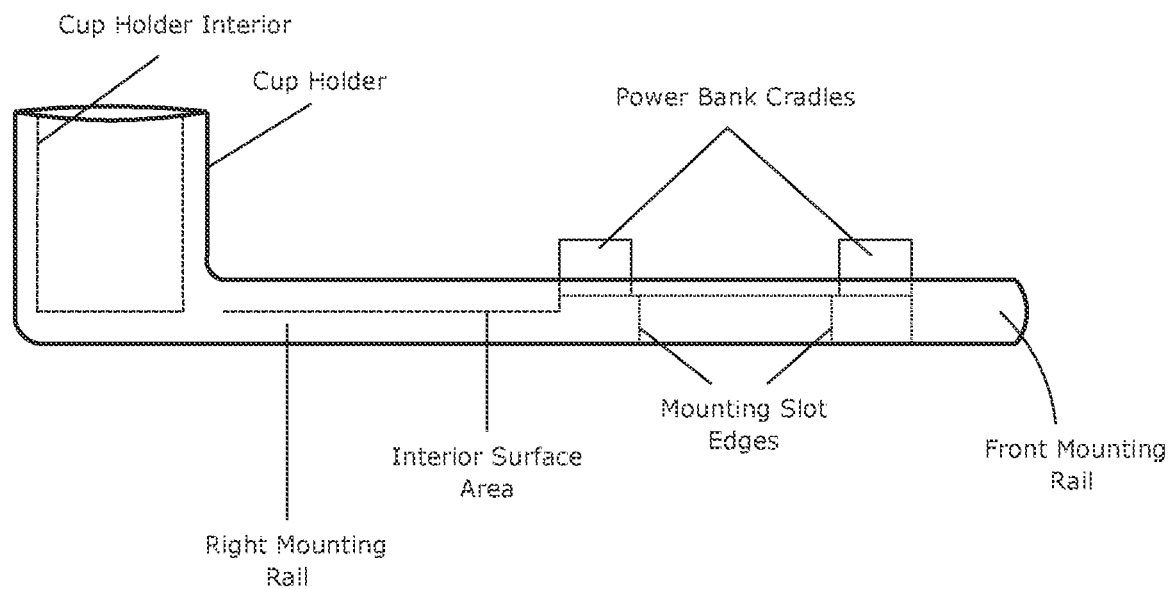
FIG. 13 illustrates a right side view of an accessory in accordance with an example embodiment.
Figure 14:
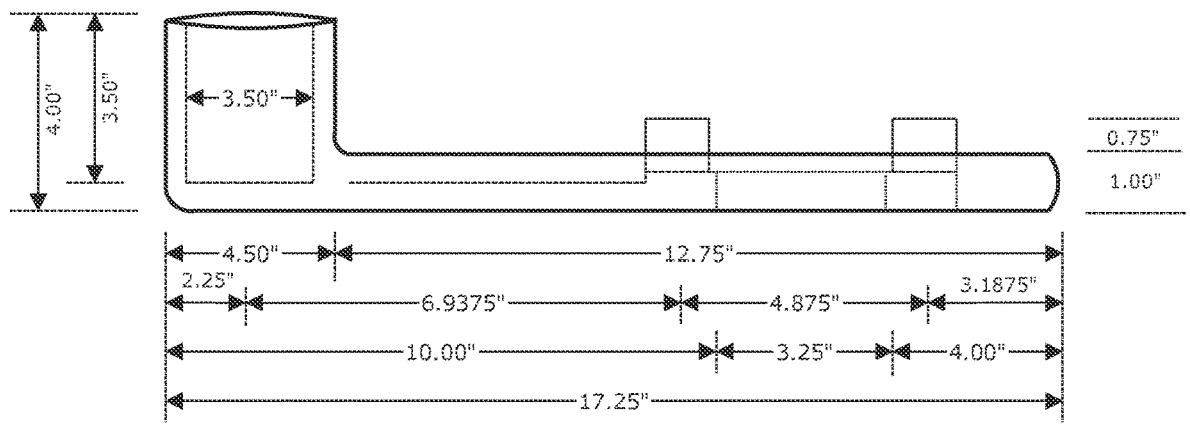
FIG. 14 illustrates a right side view of an accessory in accordance with an example embodiment.

Referring to FIG. 4, it can be seen that the recessed platform space can be divided into two areas: a main platform area positioned at the rear side of the recessed platform space and a secondary platform area positioned at the front side of the recessed platform space. As can be seen, the thickness of the main platform area can be 0.50 inches, whereas the thickness of the secondary platform area can be 0.75 inches. This arrangement means that the secondary platform area is raised higher that the main platform area. The raised nature of the secondary platform area creates a pseudo mounting rail for the main platform area at its border with the secondary platform. In this regard, items stored in the main platform area but not affixed in place can slide within the main platform area but not past the left mounting rail, the right mounting rail, the rear mounting rail, and the pseudo-mounting rail. Referring briefly to FIGS. 10 and 14, it is shown that the height of the mounting rails can be 1.00 inch, meaning that the main platform area has a recessed depth of 0.50 inches and the secondary platform area has a recessed depth of 0.25 inches as determined from the example thicknesses mentioned above.

Figure 5:
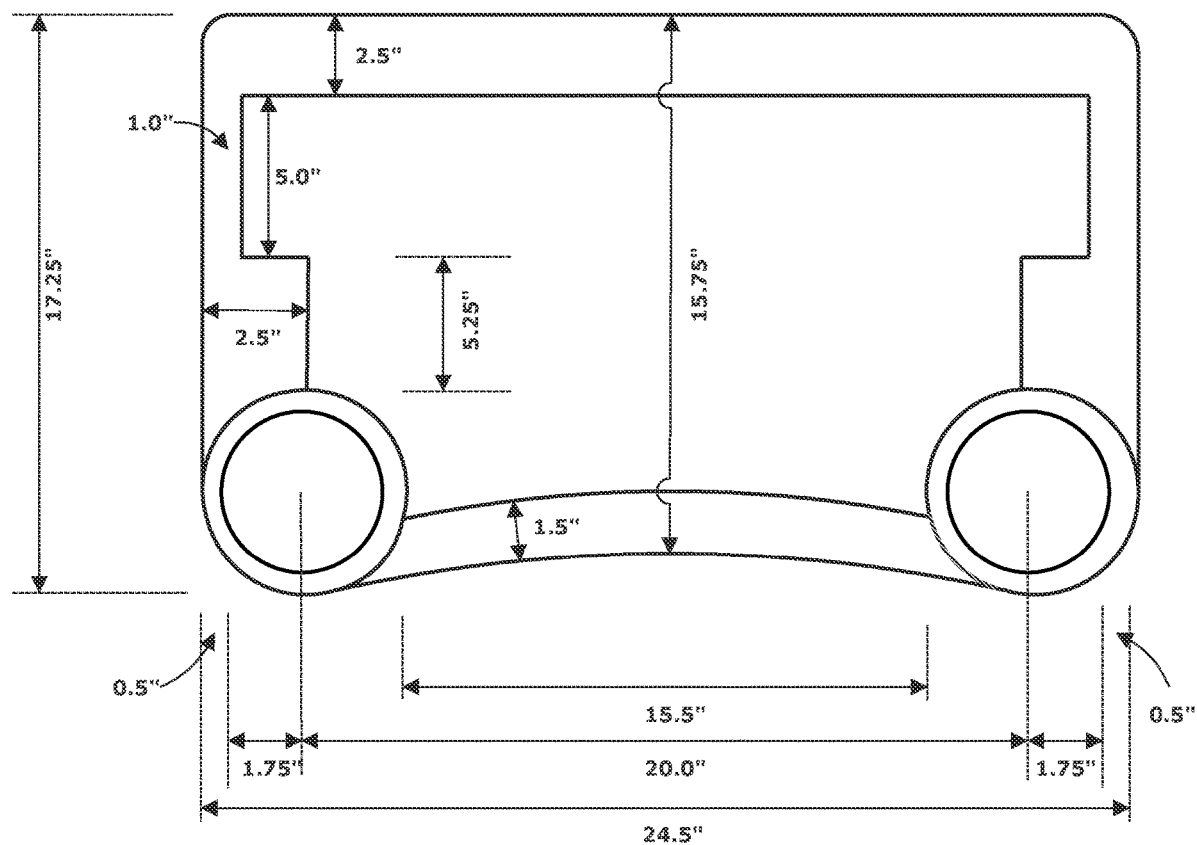
FIG. 5 illustrates a top view of an accessory in accordance with an example embodiment.
Figure 6:
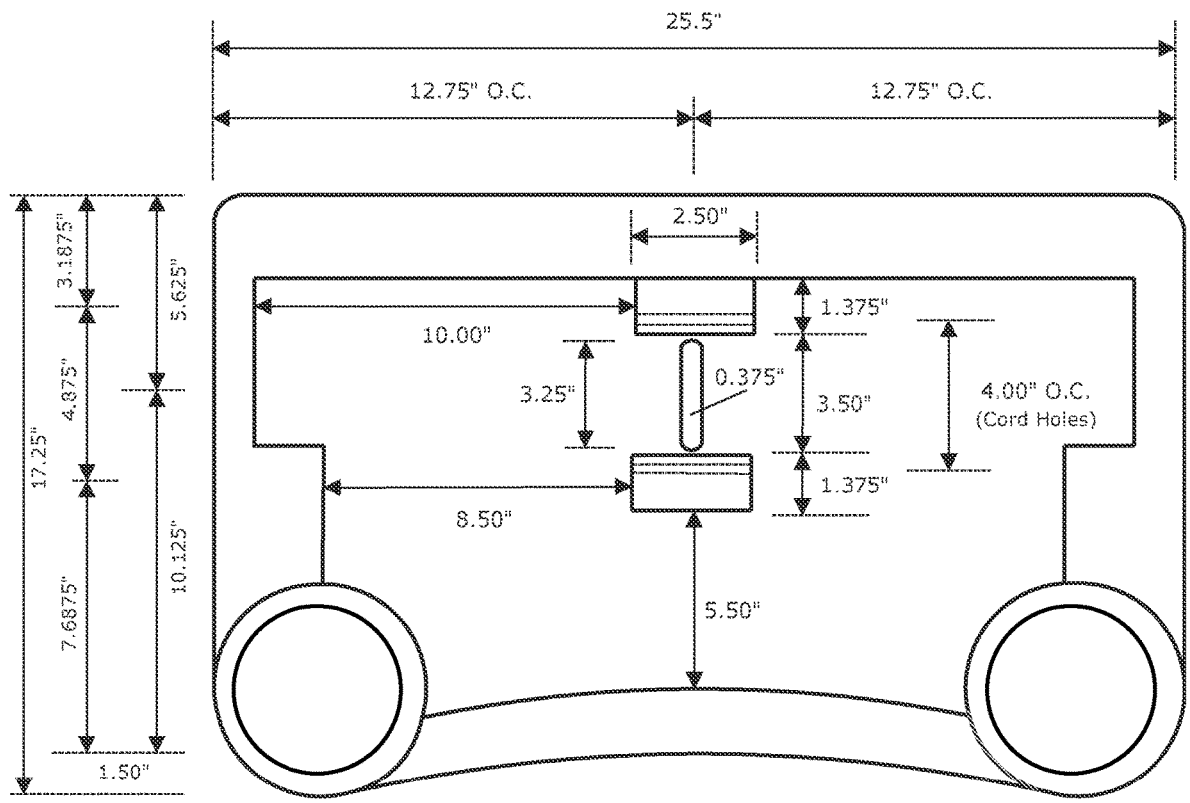
FIG. 6 illustrates a top view of an accessory in accordance with an example embodiment.
Figure 7:
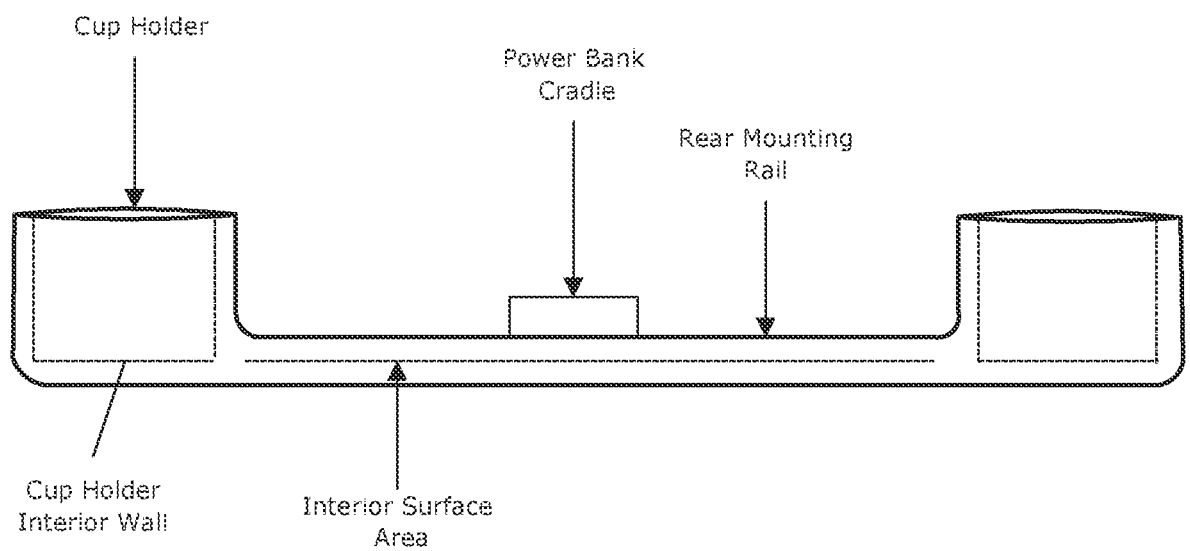
FIG. 7 illustrates a rear view of an accessory in accordance with an example embodiment.
Figure 8:
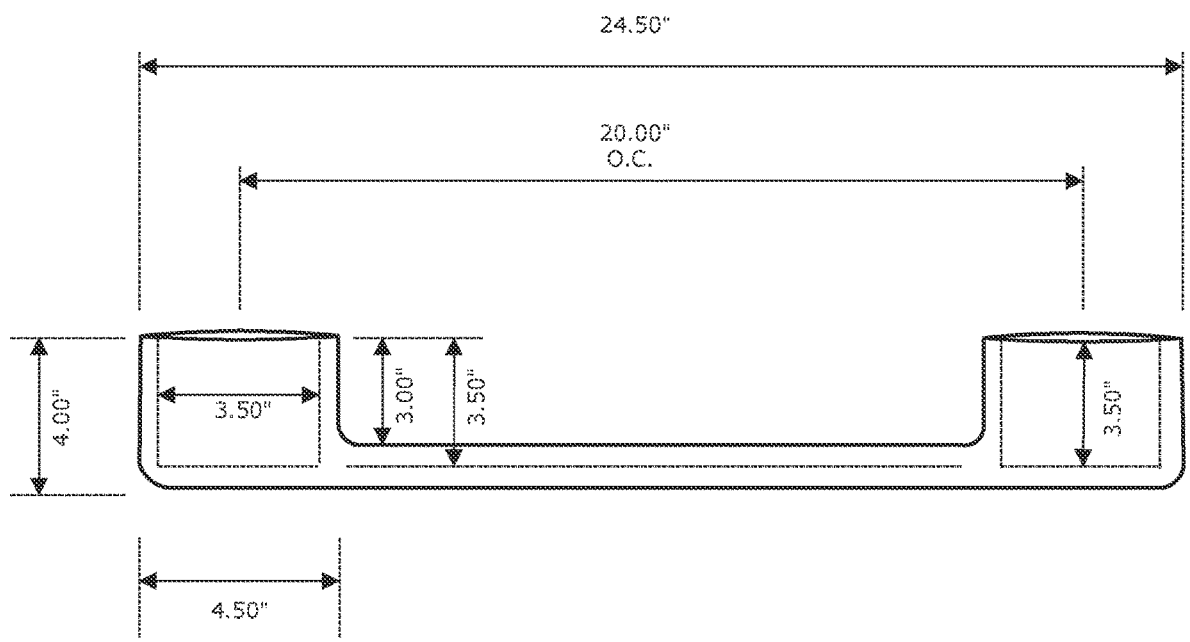
FIG. 8 illustrates a rear view of an accessory in accordance with an example embodiment.
Figure 9:
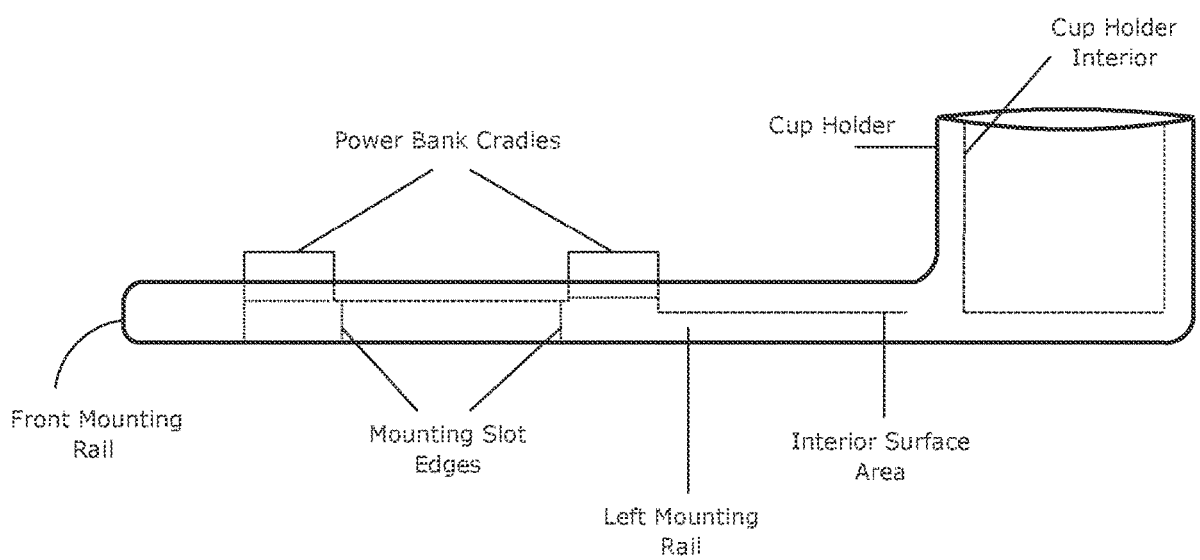
FIG. 9 illustrates a left side view of an accessory in accordance with an example embodiment.

Referring to FIGS. 5-6, various example dimensions can be seen from an overhead view. These dimensions are for lengths and widths of the accessory.

Referring to FIG. 7-14, various profile views of the accessory are depicted. In these views, various example dimensions regarding heights of the accessory are demonstrated.

Figure 15:
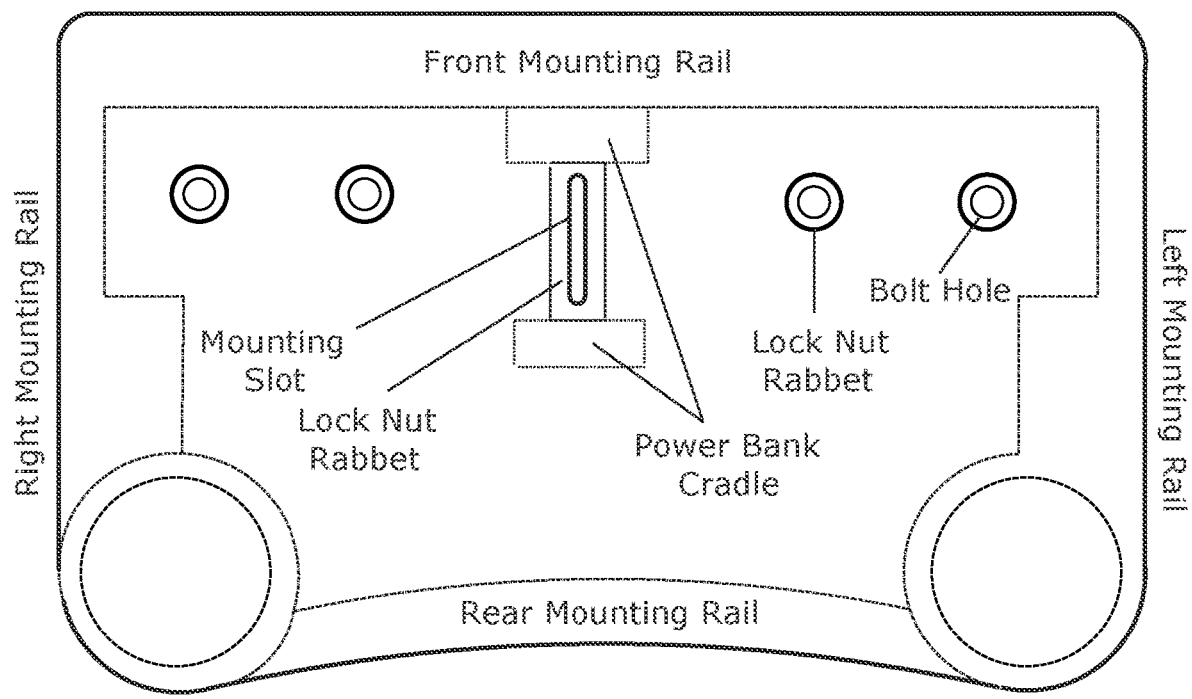
FIG. 15 illustrates a bottom view of an accessory in accordance with an example embodiment.
Figure 16:
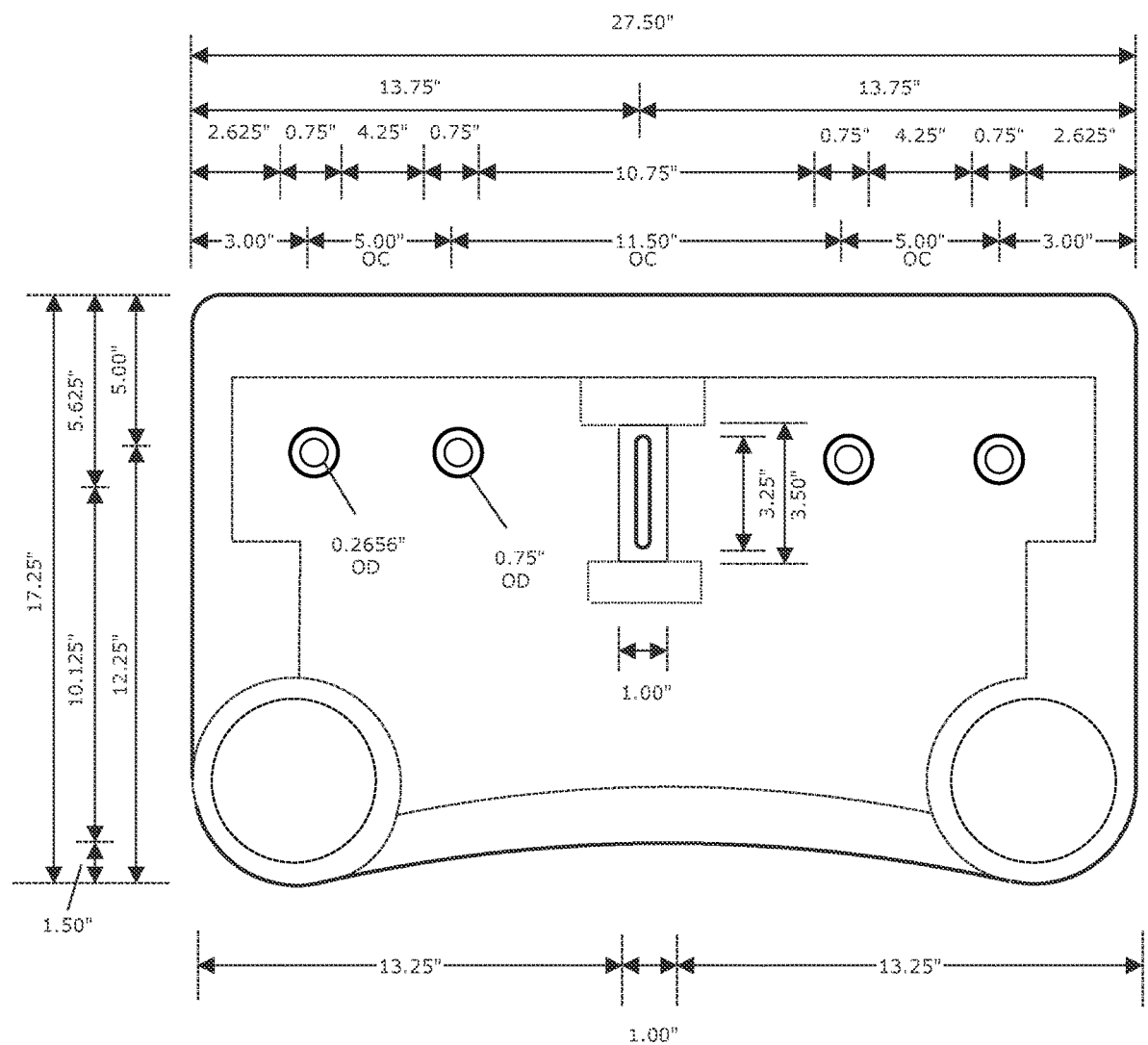
FIG. 16 illustrates a bottom view of an accessory in accordance with an example embodiment.

Referring to FIG. 15, an underside view of the accessory is depicted. As can be seen, the mounting slot is surrounded by a lock nut rabbet which allows space for a locking nut to be contained, as discussed further below. As can also be seen four bolt holes, two on either side of the mounting slot, are present. These bolt holes extend from the underside of the accessory through to the secondary platform area, as discussed further below. These four bolt holes each include their own lock nut rabbet which also allow space for a locking nut to be contained, as discussed further below. Referring to FIG. 16, various example dimensions of lengths and widths can be seen from an underside view.

Figure 17:
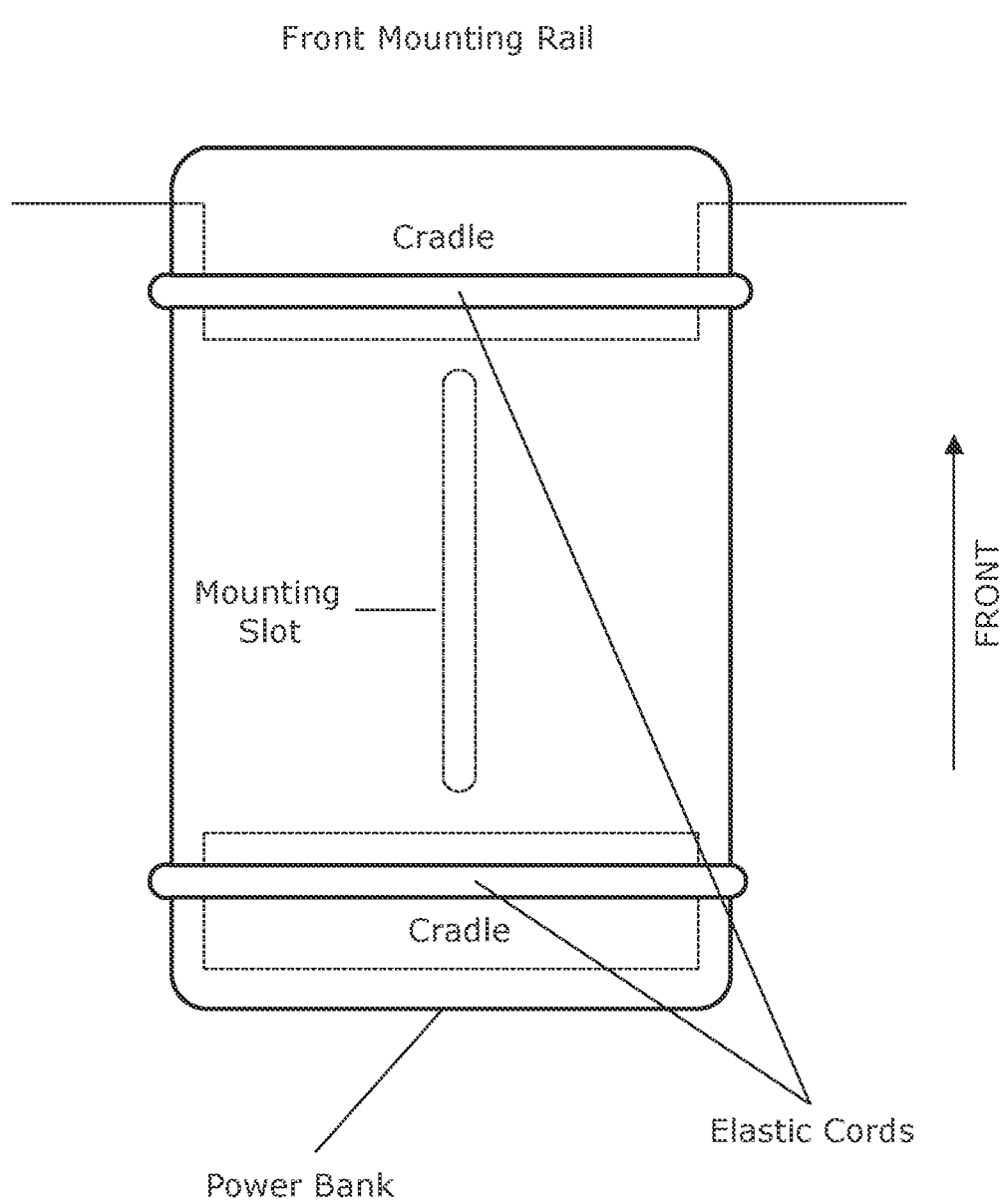
FIG. 17 illustrates a top view of certain details of an accessory in accordance with an example embodiment.
Figure 18:
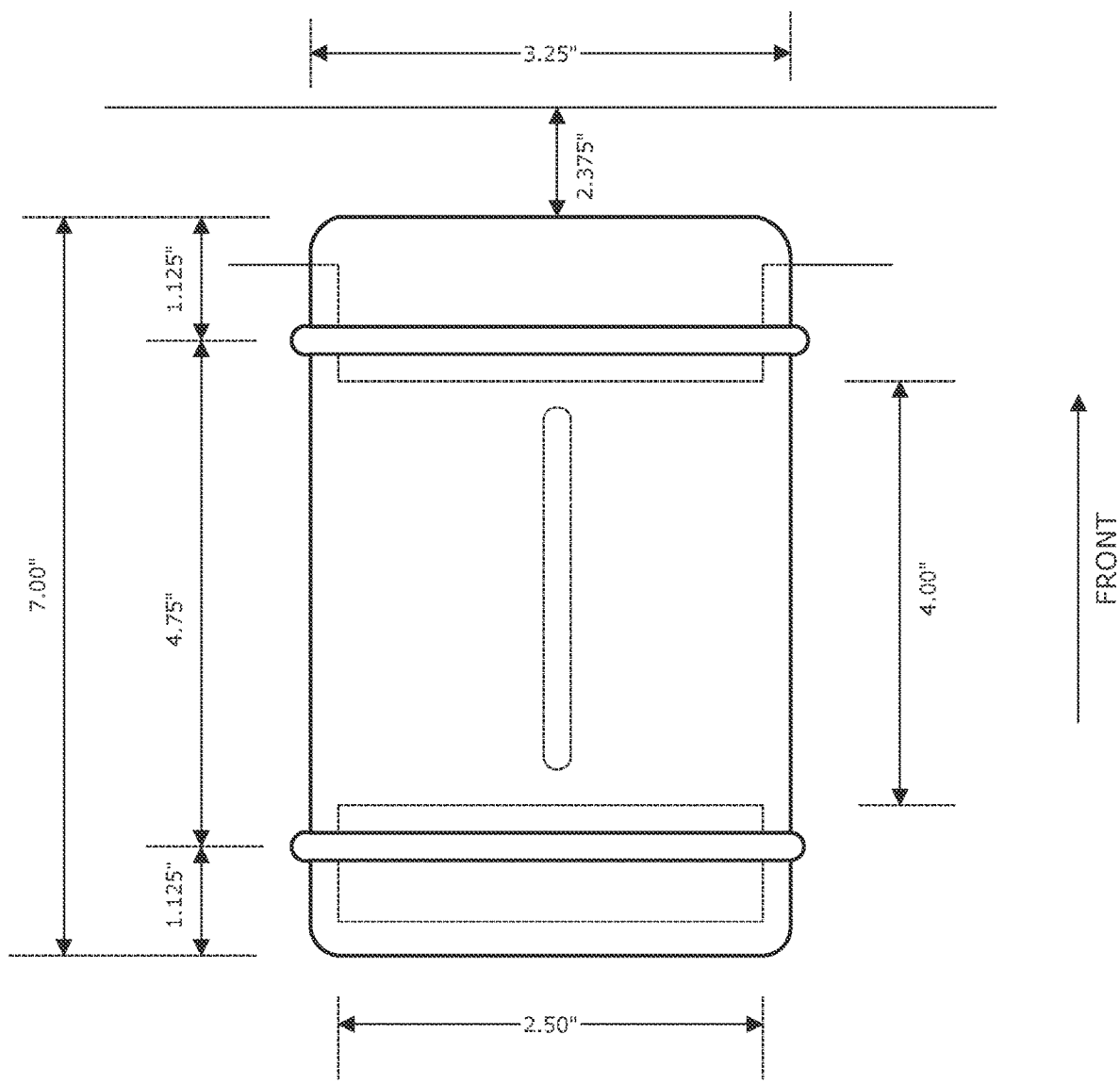
FIG. 18 illustrates a top view of certain details of an accessory in accordance with an example embodiment.
Figure 19:
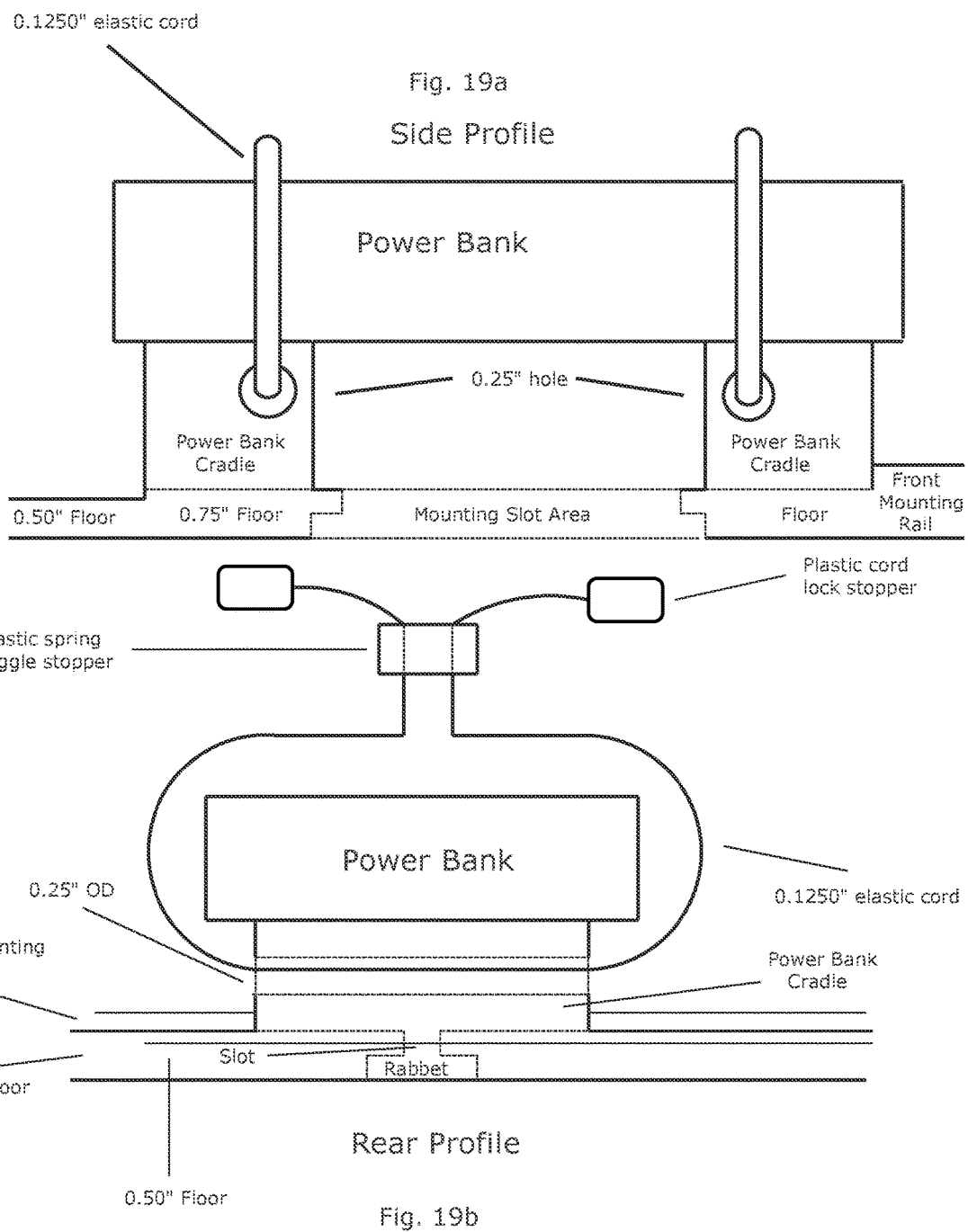
FIG. 19a illustrates a side view relating to the details shown in FIG. 17.
FIG. 19b illustrates a rear view relating to the details shown in FIG. 17.
Figure 20:
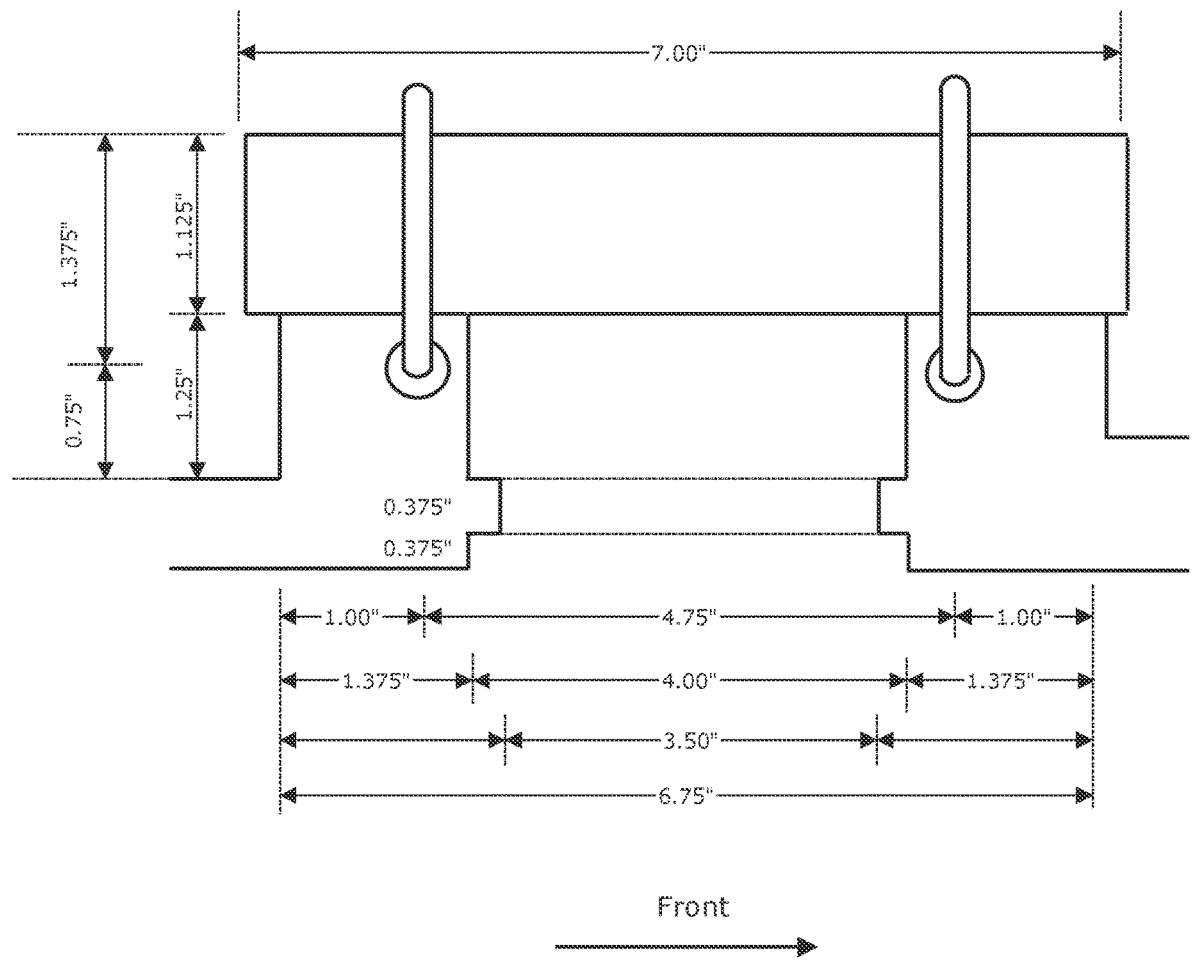
FIG. 20 illustrates a side view relating to the details shown in FIG. 17.
Figure 21:
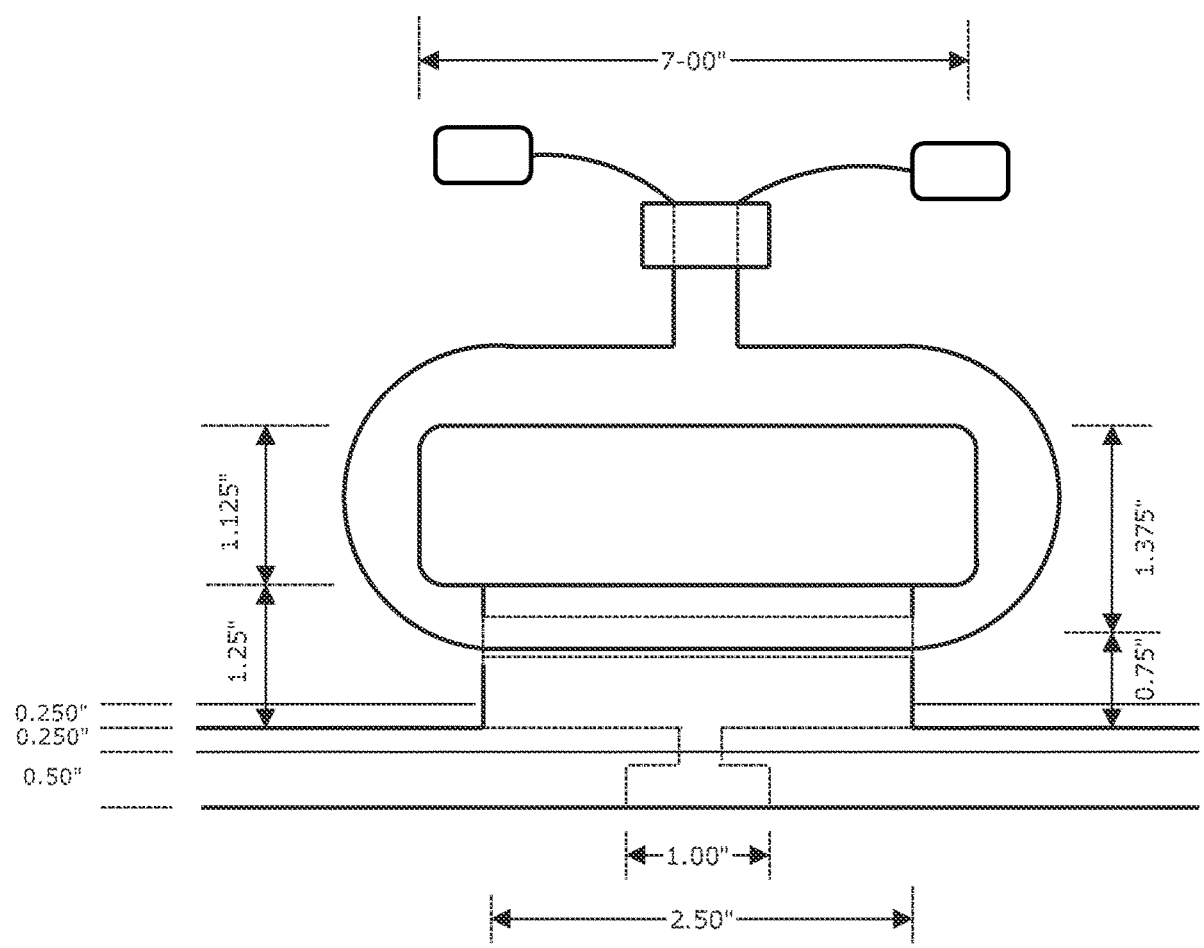
FIG. 21 illustrates a front view relating to the details shown in FIG. 17.

Referring to FIG. 17, a power bank is shown connected to the power bank cradles. The power bank rests atop the two power bank cradles, and is secured to each individually via elastic cords. Referring to FIG. 18, various example dimensions regarding the power bank connection are shown. Referring to FIG. 19a, a side profile view of the assembled power bank is shown. As can be seen, the elastic cords extend through holes in each power bank cradle to secure the power bank thereto. Referring to FIG. 19b, a rear profile view of the assembled power bank is shown. As can be seen, the elastic cord wraps around the power bank but does not connect at the top thereof, as suggested by FIGS. 17, 18 and 19a. Instead, the elastic cord has two free ends which are fed first through a spring toggle stopper, which is labeled as being plastic as an example. And the free ends of the elastic cord are each connected to a cord lock stopper, which is labeled as being plastic as an example. The spring toggle stopper can be used to releasably secure two respective points along the elastic cord together. Because the spring toggle stopper is releasably securable, the two respective points along the elastic cord connected thereto can be adjusted to loosen or tighten the elastic cord. This can allow the power bank to be removed from the accessory to, e.g., be charged, and then to re-secure the power bank to the accessory when desirable. Referring to FIGS. 20-21, side profiles of the assembled power bank are shown demonstrating various height dimensions relating to the accessory.

Figure 22:
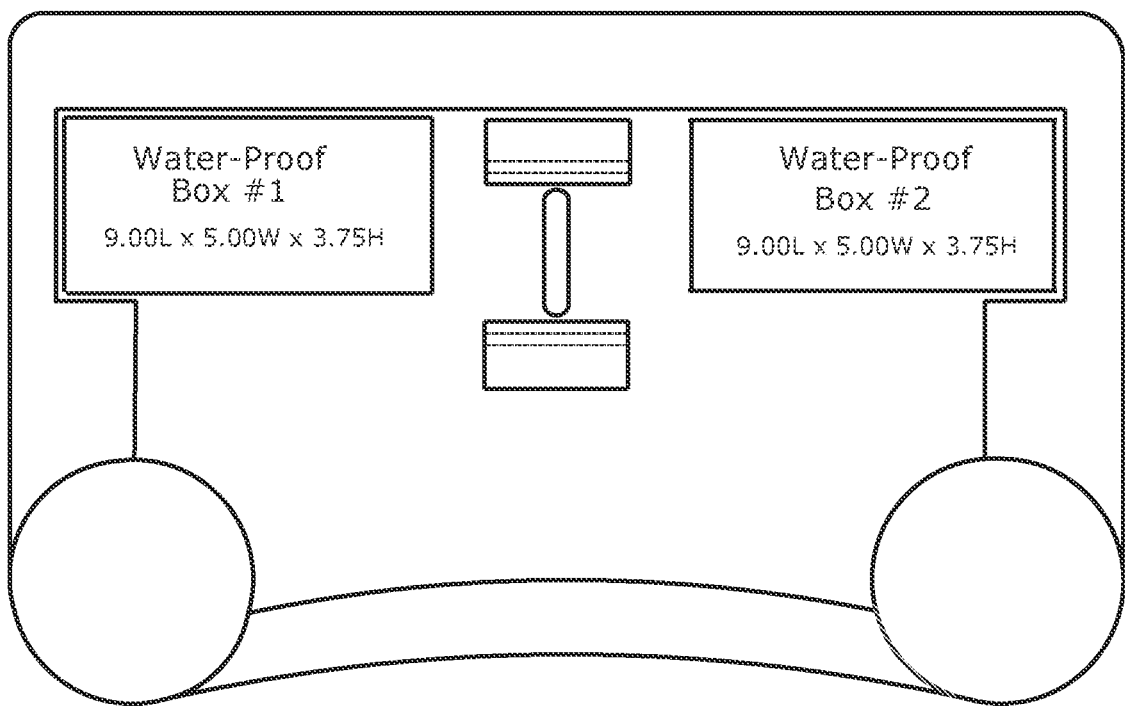
FIG. 22 illustrates a top view of additional details of an accessory in accordance with an example embodiment.
Figure 23:
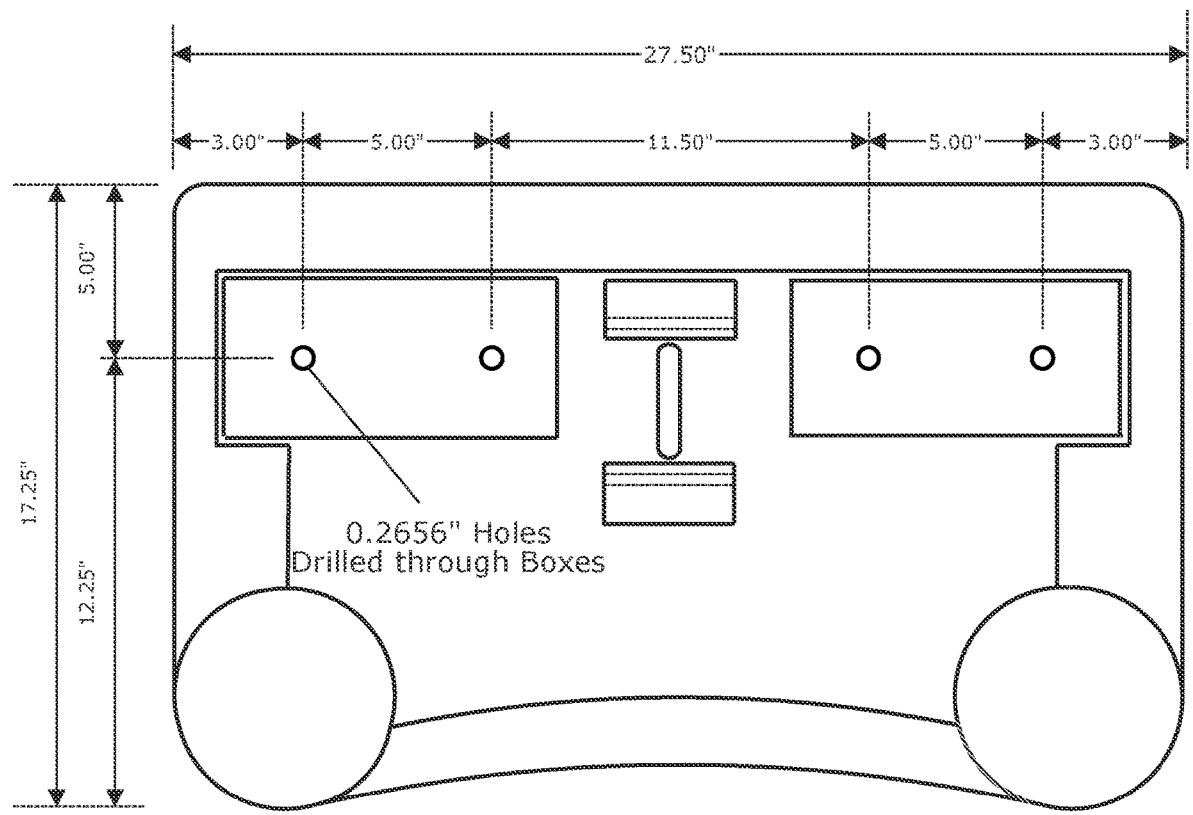
FIG. 23 illustrates a top view of additional details of an accessory in accordance with an example embodiment.
Figure 24:
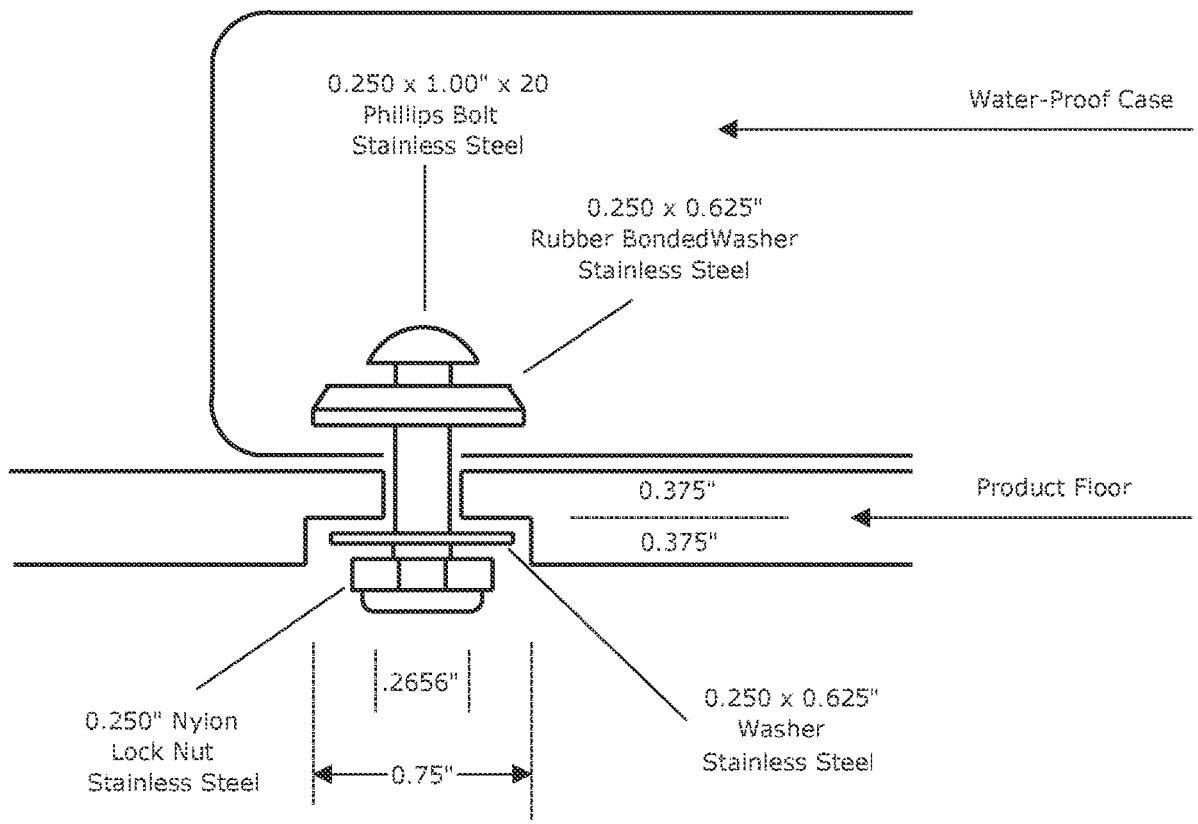
FIG. 24 illustrates a partial side view of an accessory in accordance with an example embodiment.

Referring to FIG. 22, two water-proof boxes are connected to the accessory, particular the secondary platform area thereof. Referring to FIG. 23, through holes are shown drilled through the water-proof boxes. These through holes are configured to align with the bolt holes of the accessory depicted in FIGS. 15-16 and discussed above. Referring to FIG. 24, an exemplary fastener assembly are configured to connect the water-proof boxes to the accessory. As depicted, the exemplary fastener assembly includes a bolt, a pair of washers, and a locking nut. A fastener assembly is asserted through each bolt hole and corresponding through hole to secure the water-proof boxes to the assembly.

Figure 25:
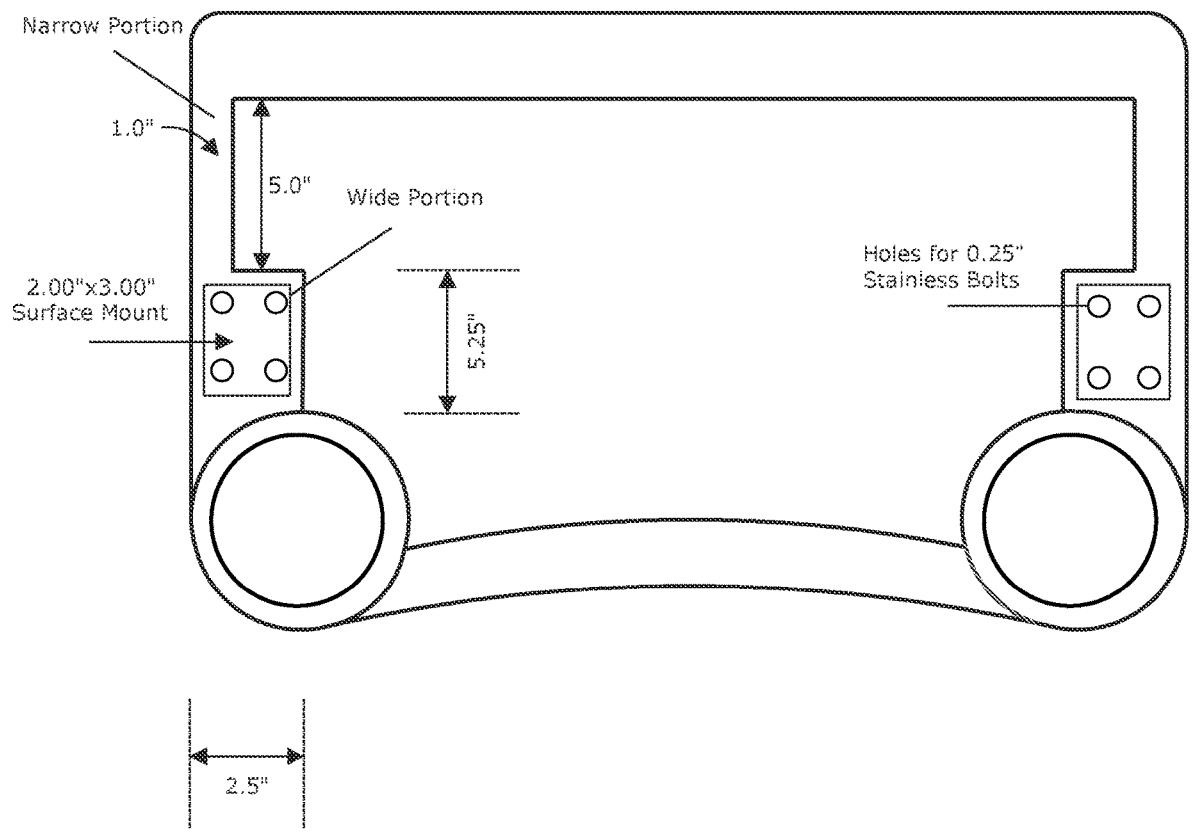
FIG. 25 illustrates a top view of additional details of an accessory in accordance with an example embodiment.
Figure 26:
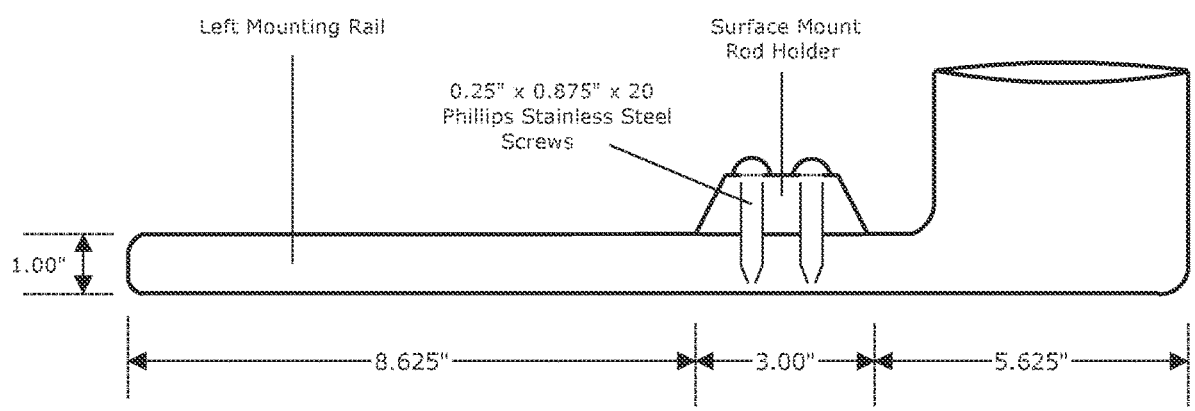
FIG. 26 illustrates a side view of additional details of an accessory in accordance with an example embodiment.

Referring to FIG. 25, it is to be appreciated that the left and right mounting rails each include a narrow portion and a wide portion. As shown, the wide portions of mounting rails are provided with holes for receiving fasteners in order to secure rod holders for fishing rods. Various example dimensions of lengths and widths relating to the rod holder portions of the accessory are depicted in FIG. 25. Referring to FIG. 26, a side profile view of a rod holder connected to the accessor is depicted. As can be seen, exemplary fasteners such as screws can be used to secure the rod holder to the accessory.

Figure 27:
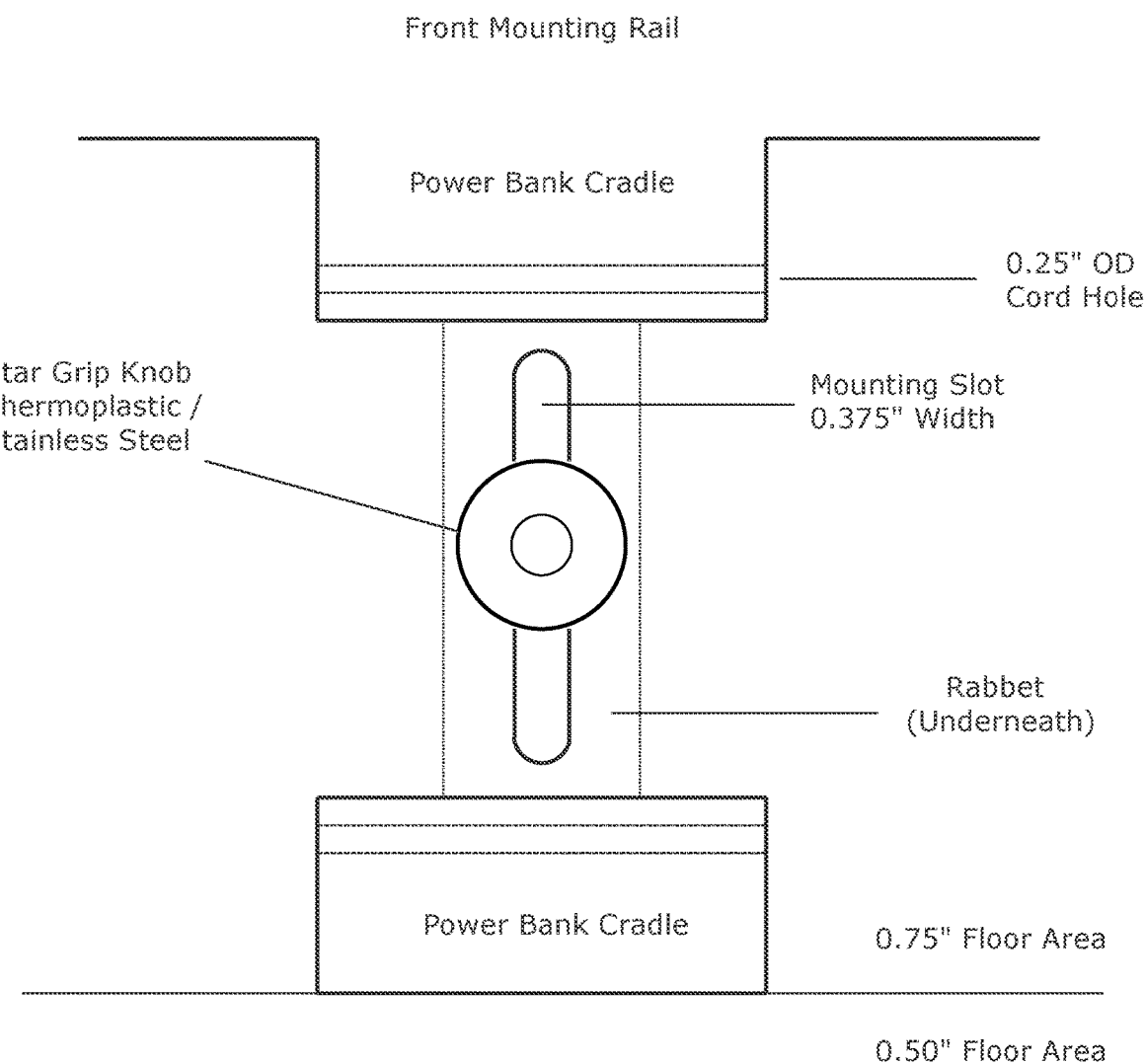
FIG. 27 illustrates a partial top view of an accessory in accordance with an example embodiment.
Figure 28:
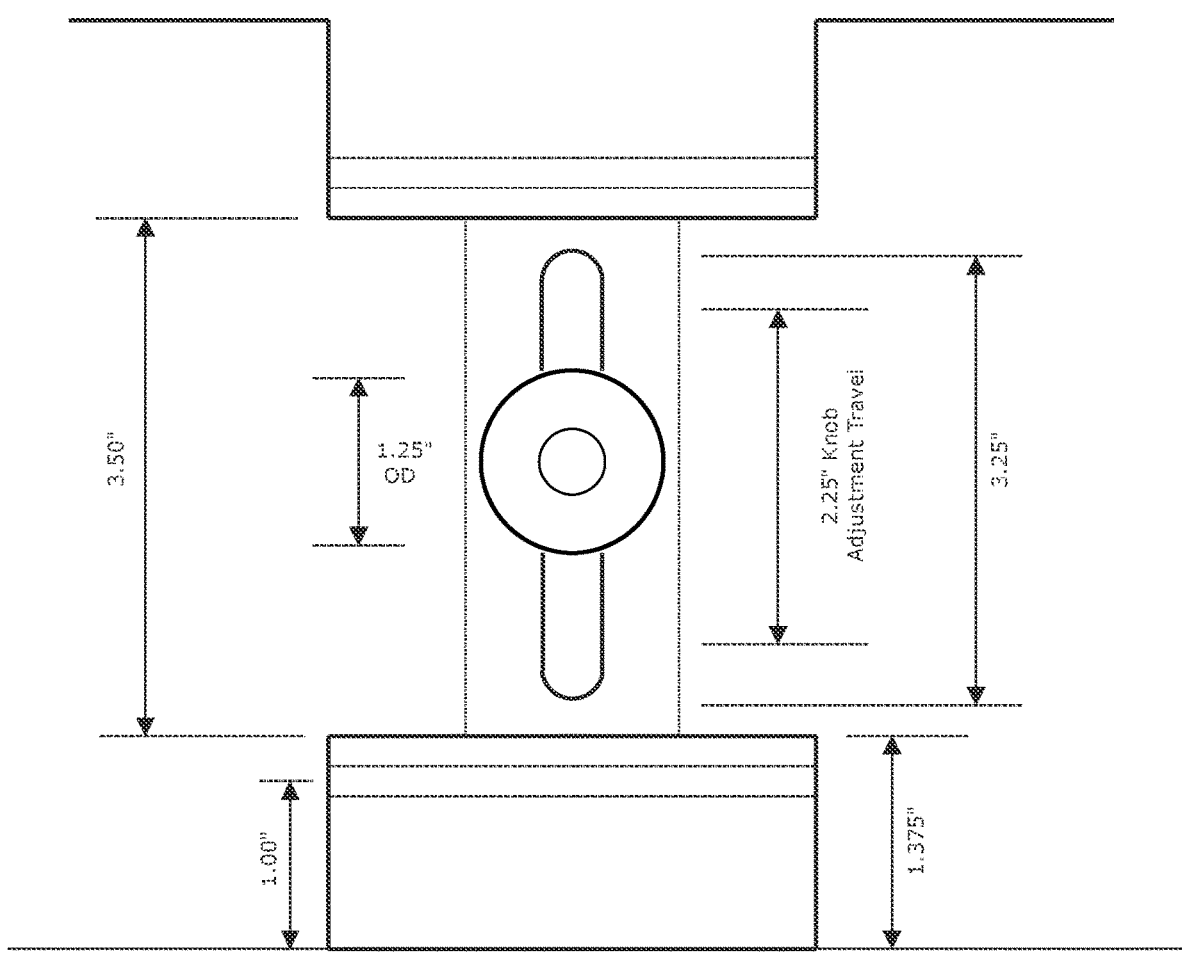
FIG. 28 illustrates a partial top view of an accessory in accordance with an example embodiment.
Figure 29:
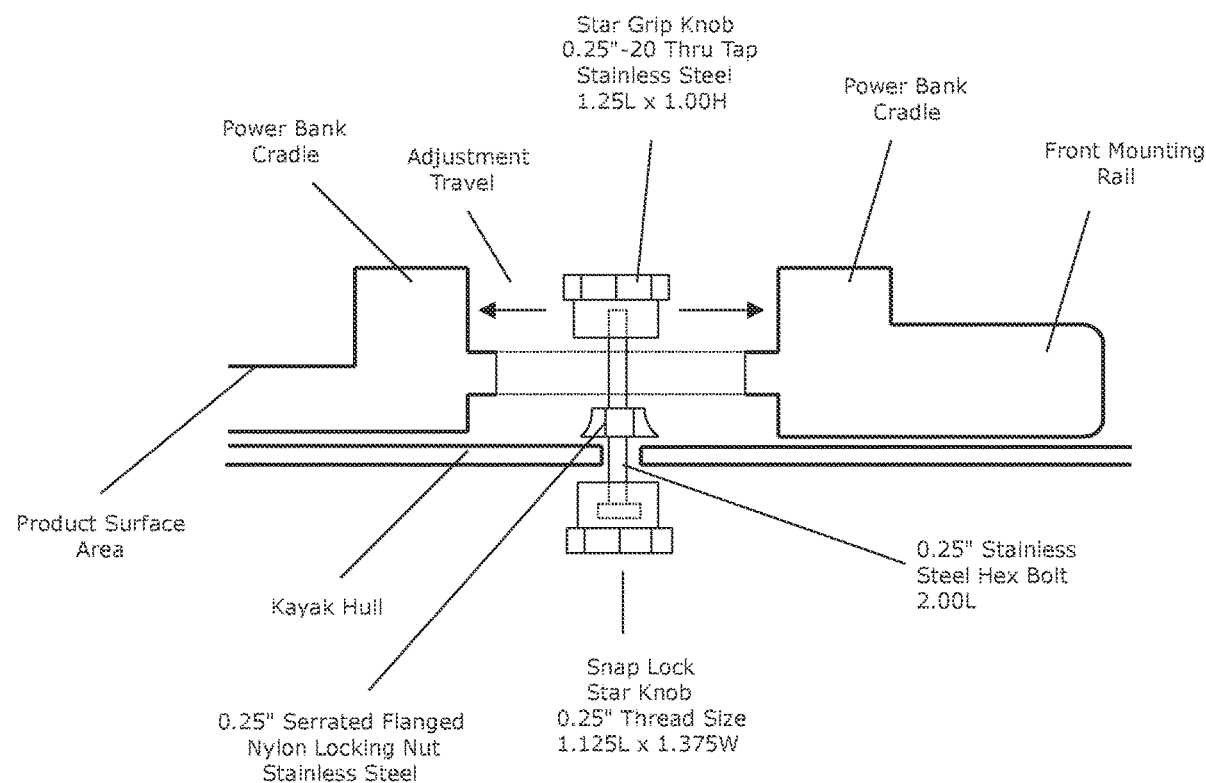
FIG. 29 illustrates a partial side view of an accessory in accordance with an example embodiment.
Figure 30:
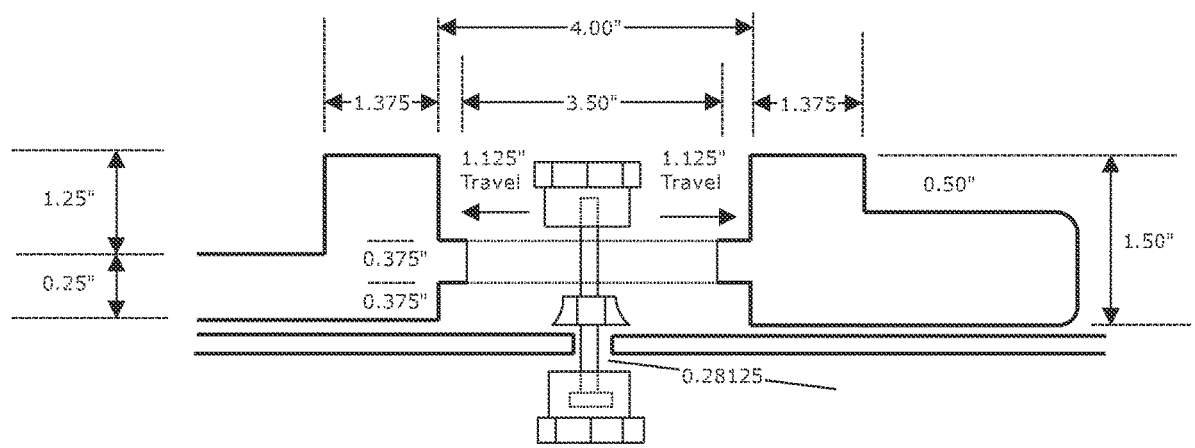
FIG. 30 illustrates a partial top view of an accessory in accordance with an example embodiment.

Referring to FIG. 27, a portion of an exemplary mounting fastener assembly is depicted for connecting to the accessory to a kayak. Specifically, a star grip knob is shown. Referring to FIG. 28, various example dimensions of length and width relating to the mounting fastener are depicted. As can be seen, the mounting slot has a length that allows the kayak accessory to be mounted to the kayak at a variety of positions corresponding to varying positions of the mounting fastener assembly within the mounting slot. Referring to FIG. 29, a side profile view of the mounting fastener assembly and surrounding environment are depicted. As shown, the mounting fastener assembly includes, in addition to the star grip knob mentioned above, a hex bolt, a flanged locking nut, and a snap lock star knob. The snap lock star knob is connected to an end of the hex bolt positioned on an under side of the hull of the kayak. The flanged locking nut is positioned along the hex bolt on an upper side of the hull of the kayak and is positioned within the rabbet of the mounting slot when the accessory is assembled in place. The flanged locking nut and snap lock star knob are configured to secure the hex bolt to the kayak. The star grip knob is connected to the hex bolt and the opposite end from the snap lock star knob and is configured to secure the accessory to the hex bolt and thus the kayak. Referring to FIG. 30, various example dimensions relating to the height and length of the mounting fastener assembly and surrounding environment are depicted.

Figure 31:
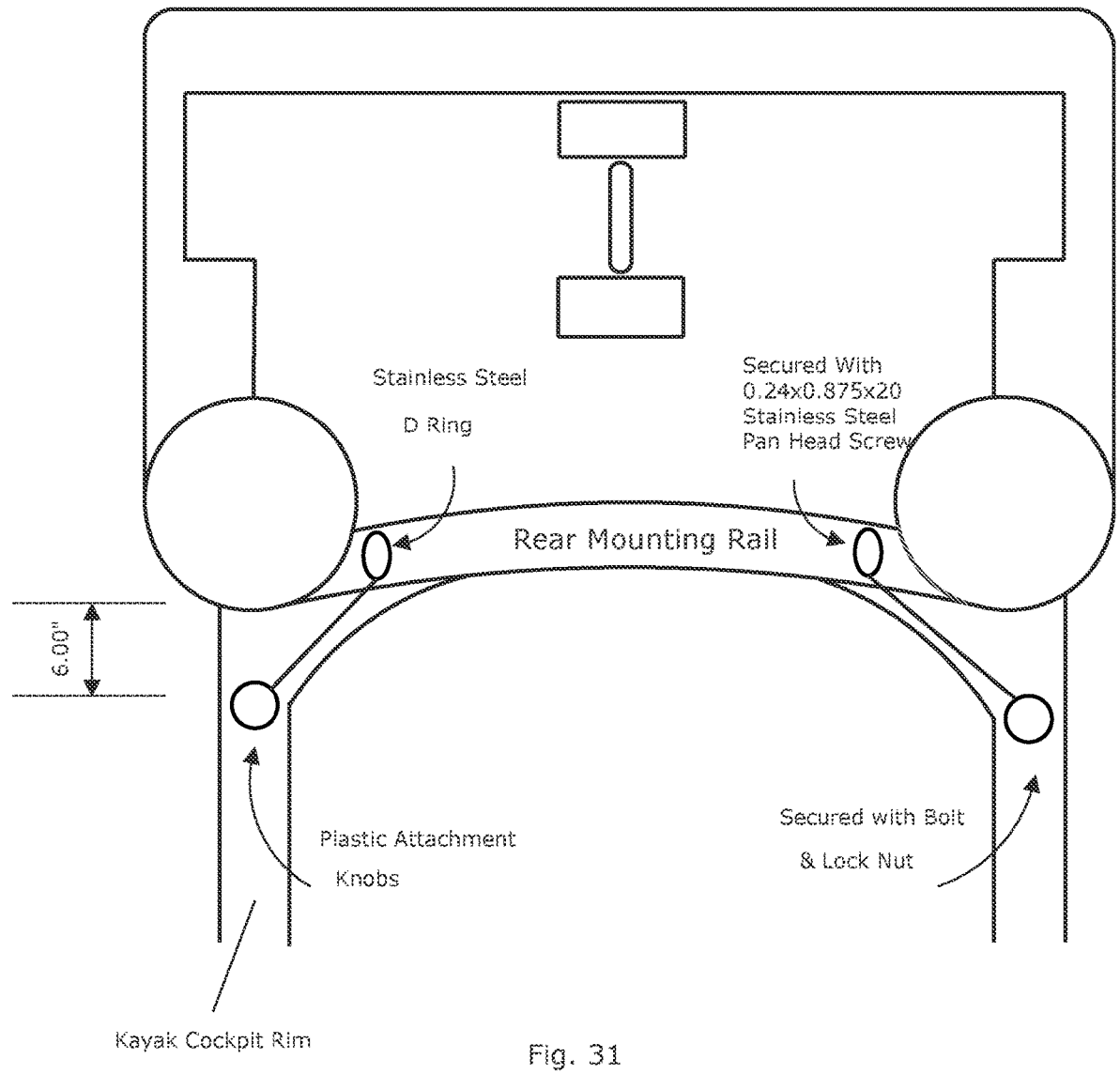
FIG. 31 illustrates a top view relating to features for connecting the accessory to a watercraft in accordance with an example embodiment.
Figure 32A:
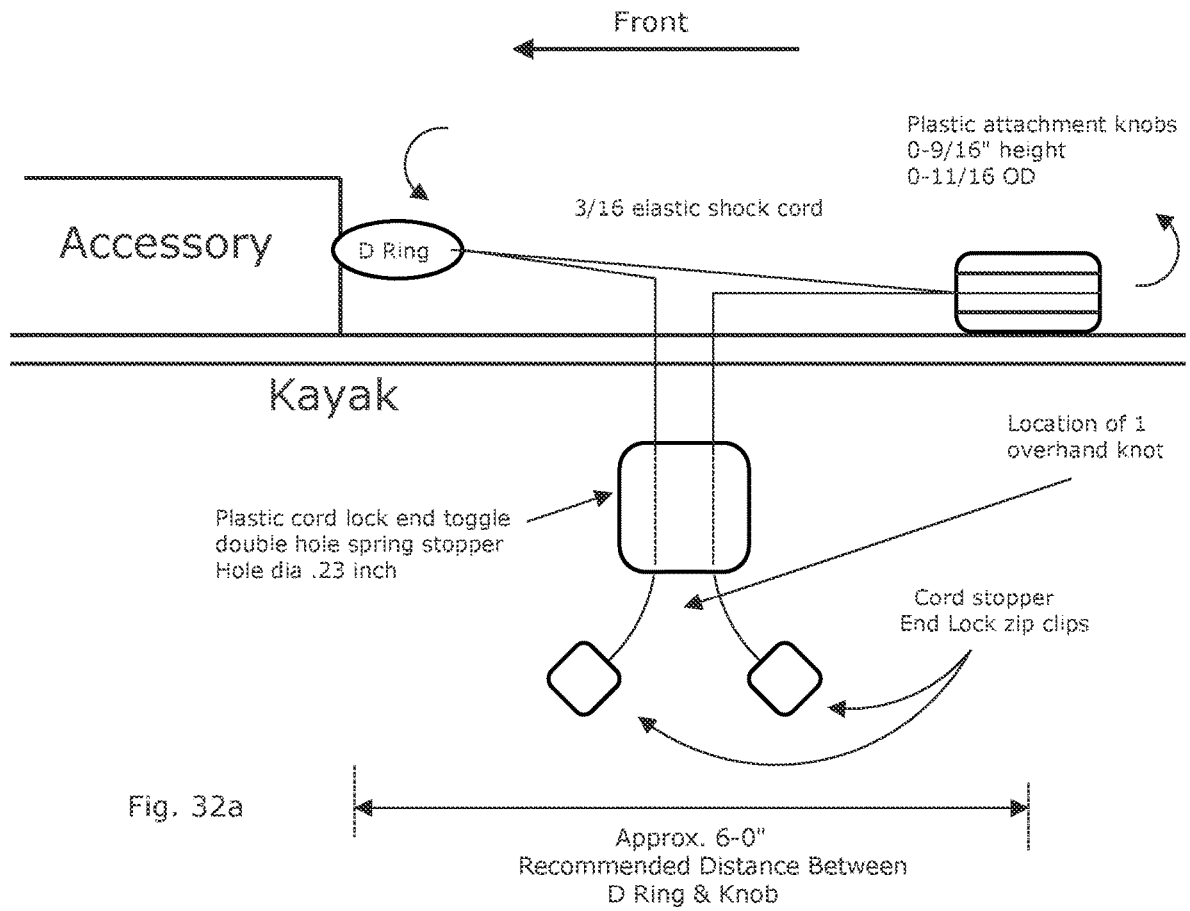
FIG. 32a illustrates a side view relating to the features illustrated in FIG. 31.
Figure 32B:
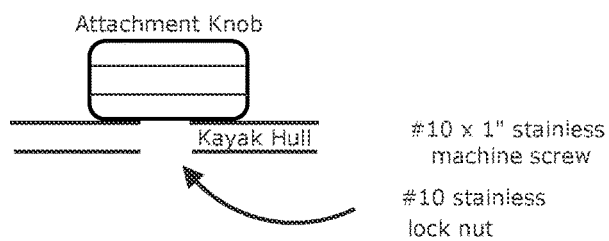
FIG. 32b illustrates a side view relating to the features illustrated in FIG. 31.

Referring to FIG. 31, certain features relating to secondary attachment mechanism are depicted. First, a pair of connecting rings labeled as D rings are shown connected to the rear mounting rail near each respective cup holder. As suggested in FIG. 31, a screw is an exemplary fastener that can be used to connect the each connecting ring to the accessory. Second, a pair of attachment knobs are shown connected to the rim of the cockpit near each respective cup holder. Referring to FIG. 32*a*, an elastic shock cord is depicted that connects each connecting ring to the nearest attachment knob thereto. Similar to the elastic cords for the power bank, the elastic shock cords have two free ends connected to cord stoppers and a spring stopper for securing the two ends of the electric shock cords together. Each elastic shock cord provides an additional attachment between the kayak and the kayak accessory. Referring briefly to FIG. 32*b*, an exemplary fastener assembly in the form of a screw and a lock nut are depicted for connecting the attachment knob to the hull of the kayak.

Figure 33:
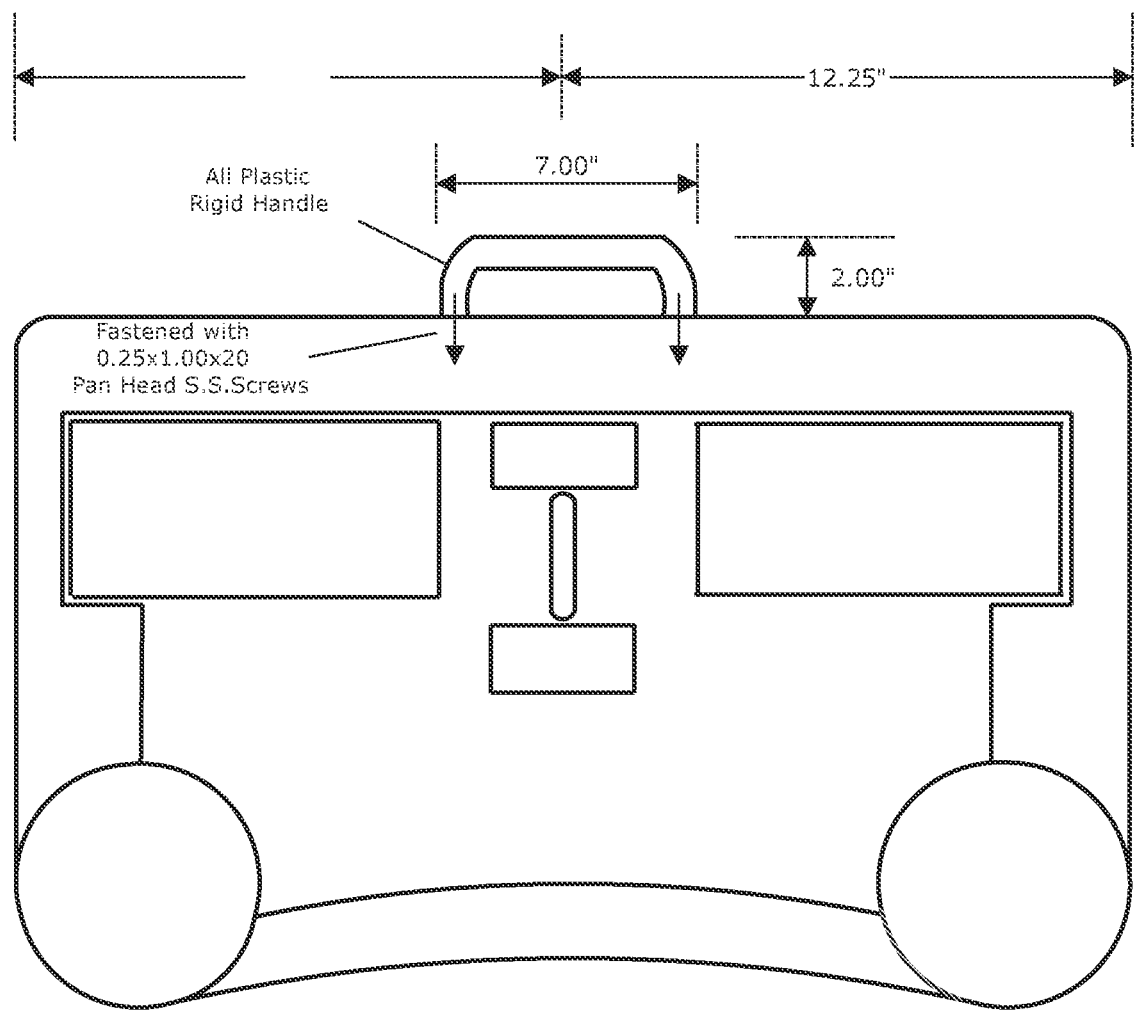
FIG. 33 illustrates a top view relating to features of an accessory in accordance with an example embodiment.
Figure 34:
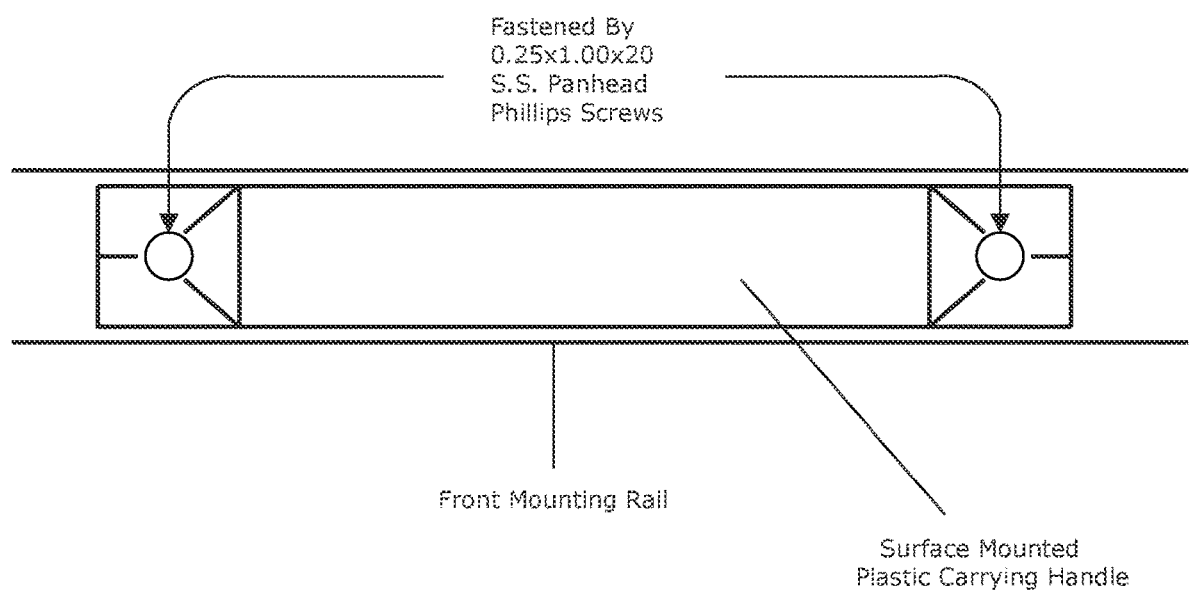
FIG. 34 illustrates a front view of the features illustrated in FIG. 33.

Referring to FIGS. 33-34, a rigid handle is shown connected to the kayak accessory, particularly the outer side face of the front mounting rail. This rigid handle can be used to assist in carrying the kayak accessory when it is not connected to a kayak.

Figure 35:
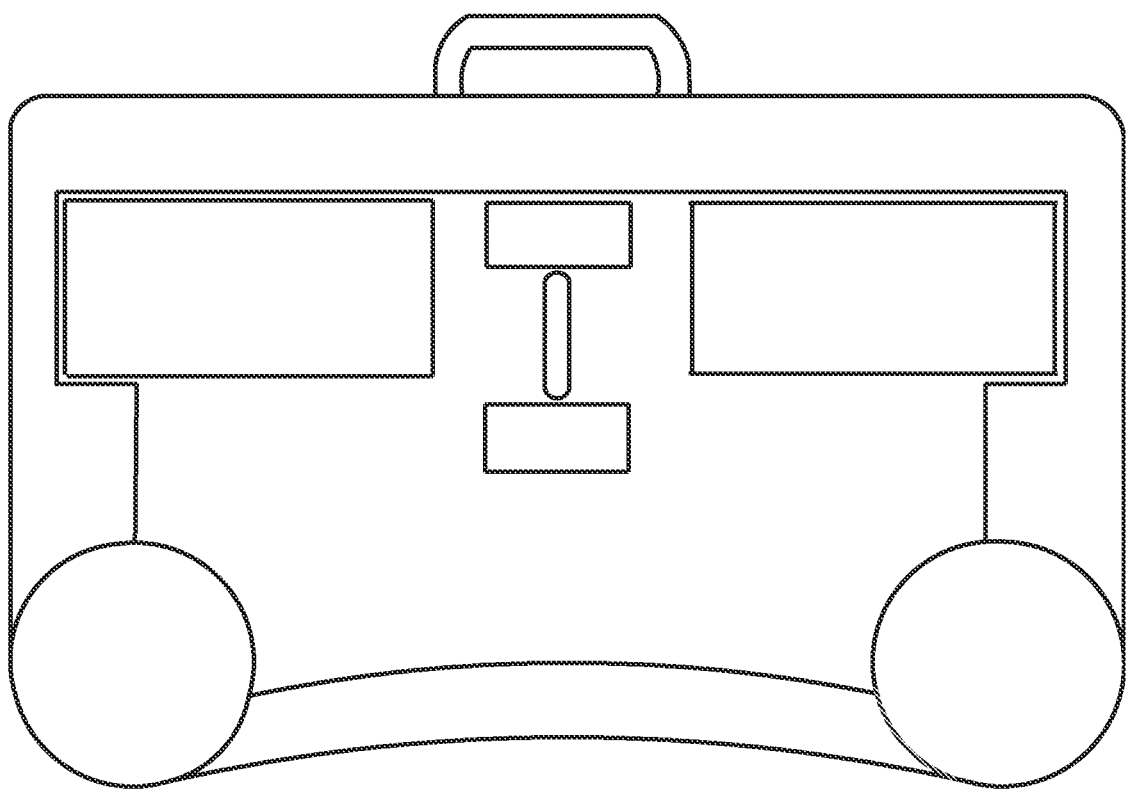
FIG. 35 illustrates a top view of an accessory as well as further components for connecting to the accessory in accordance with an example embodiment.

Referring to FIG. 35, a kit containing the kayak accessory can include, in addition to all the components discussed above, a retractable coil having a key loop at one end a karabiner at another end. A connector, depicted as an eyelet screw, is also included. This eyelet screw can be connected to the kayak accessory at any desirable location, with the key loop connected to the eyelet thereof. The karabiner can then be connected to an item or the user in order to help secure the item to the kayak accessory or help further secure the kayak accessory.

Figure 36:
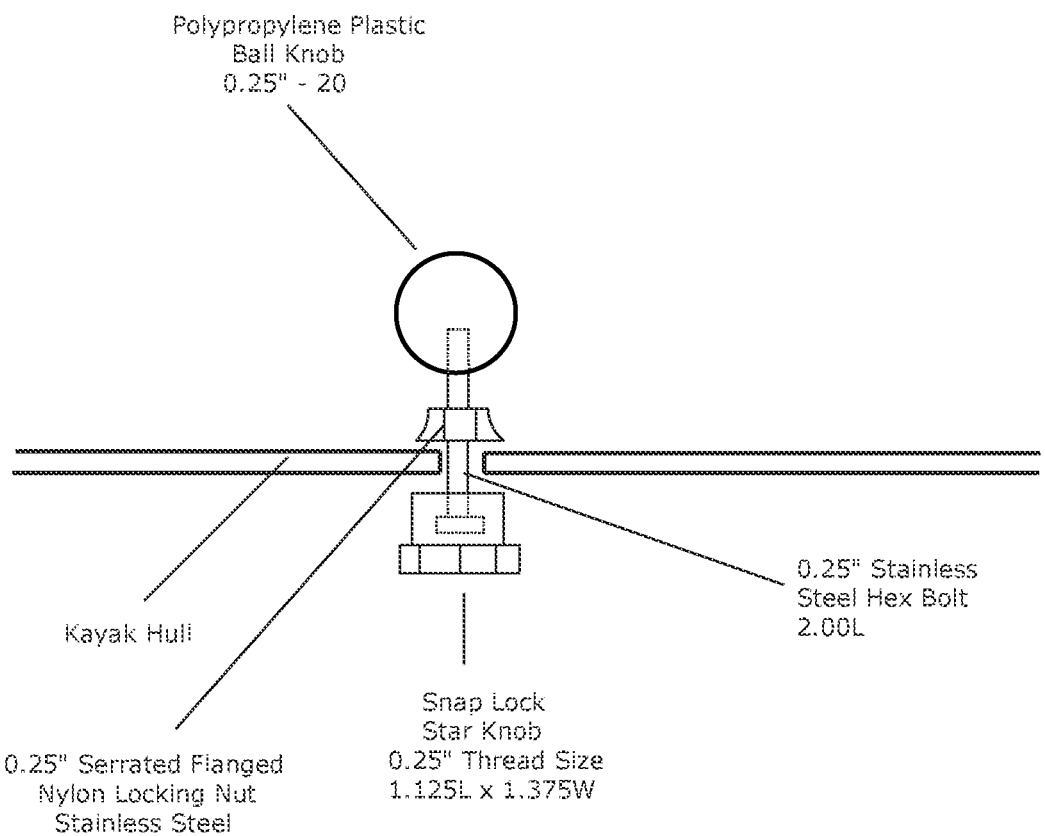
FIG. 36 illustrates a side view relating to features for mounting an accessory to a watercraft in accordance with an example embodiment.

Referring to FIG. 36, the kit containing the kayak accessory can further include a ball knob that can be used to connect to the end of the mounting fastener assembly when the kayak accessory is not secured to the kayak.

Figure 37:
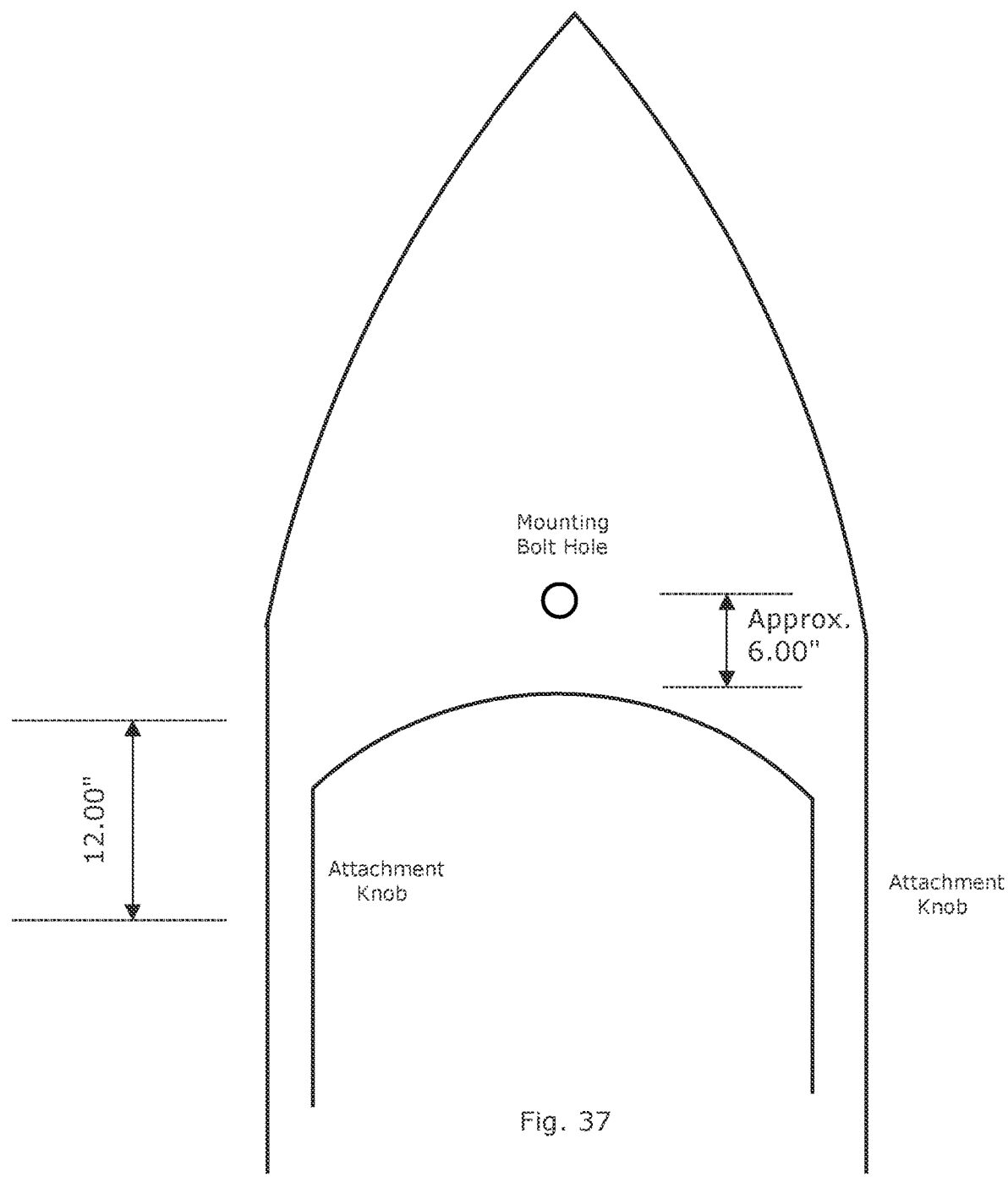
FIG. 37 illustrates a top view of a watercraft for connection to an accessory in accordance with an example embodiment.

Referring to FIG. 37, example dimensions relating to the portions of the kayak configured to connect with the kayak accessory are shown. Specifically, example dimensions relating to the placement of a mounting bolt hole and the attachment knobs are depicted.

Figure 38:
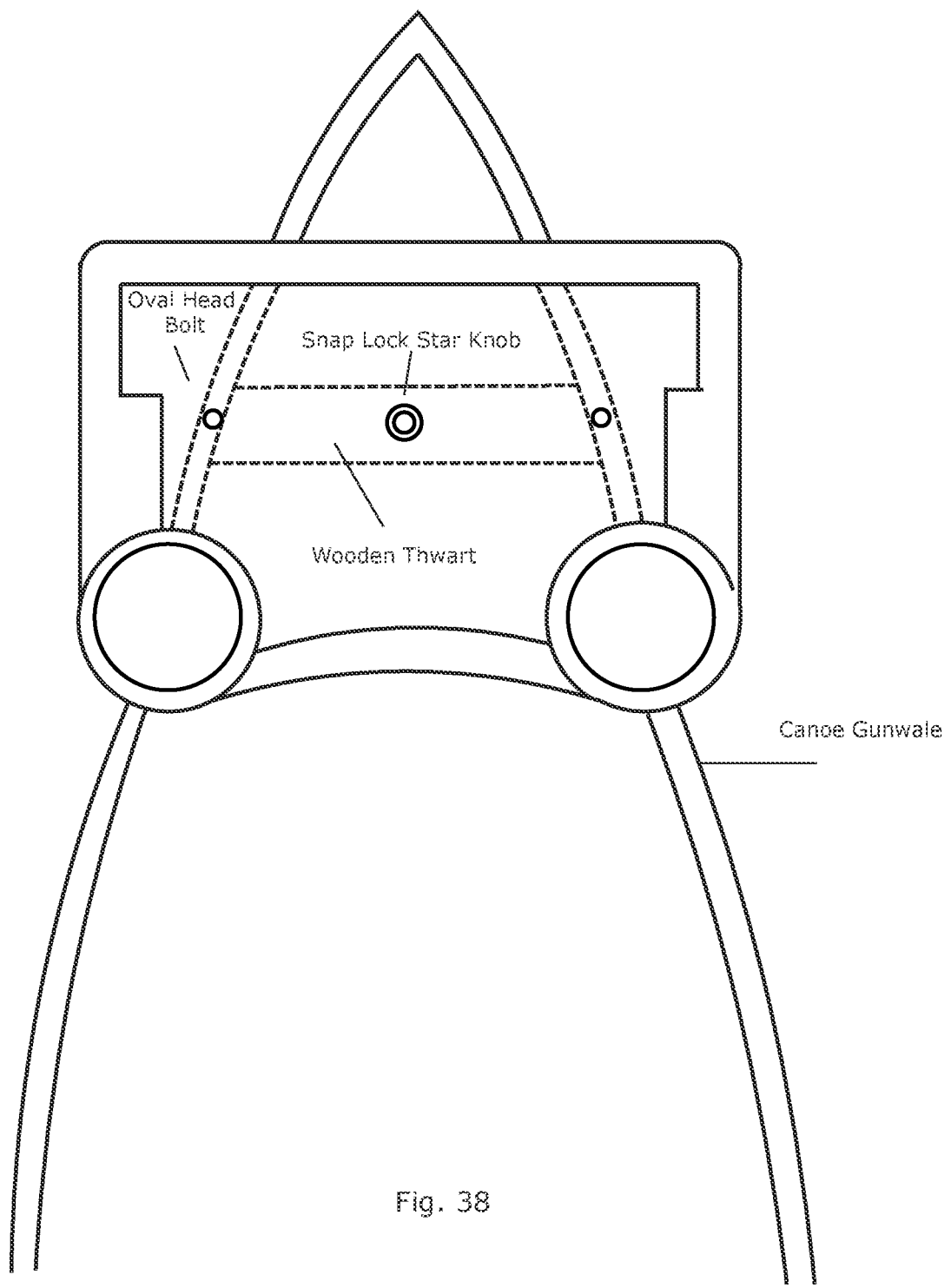
FIG. 38 illustrates a top view of mounting an accessory to a watercraft in accordance with an example embodiment.
Figure 39:
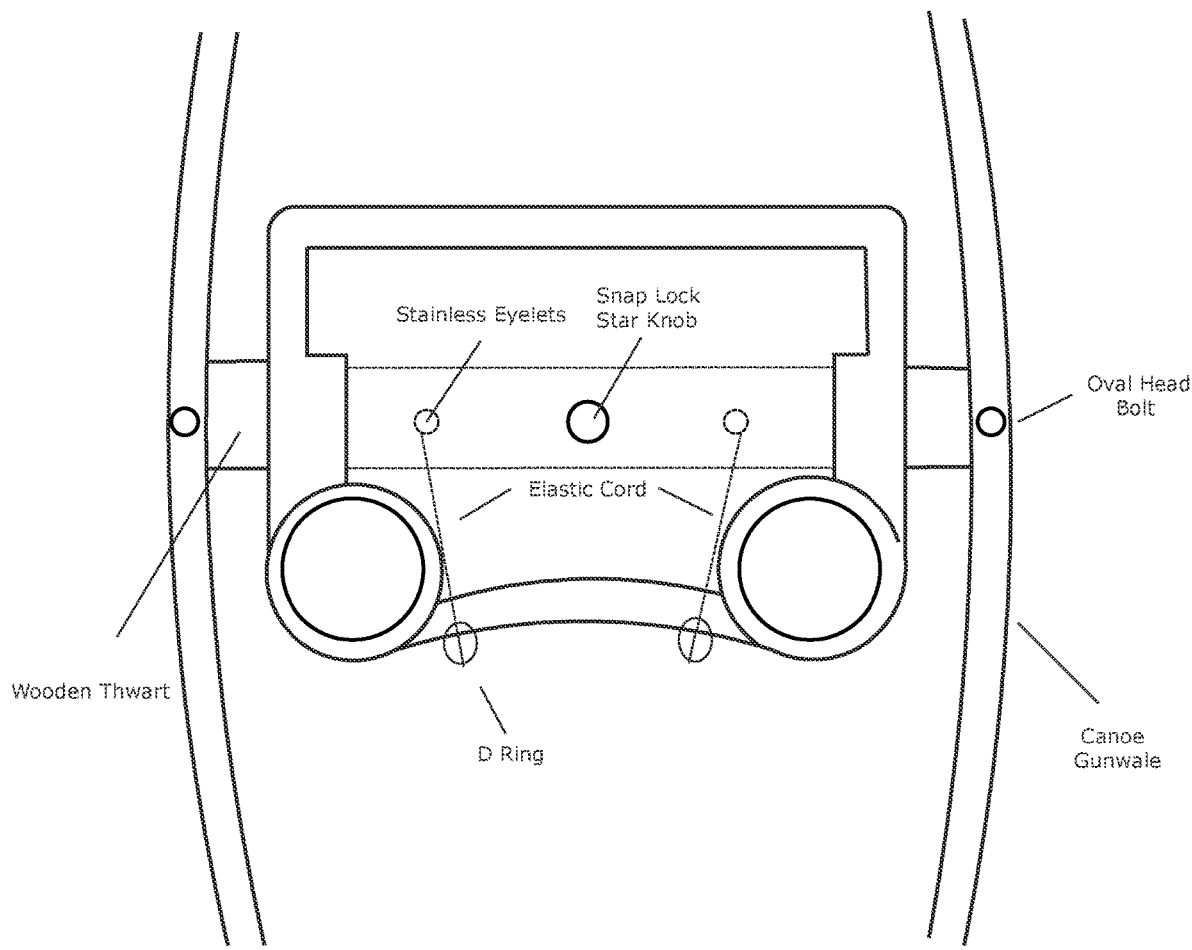
FIG. 39 illustrates a top view of mounting an accessory to a watercraft in accordance with an example embodiment.
Figure 40:
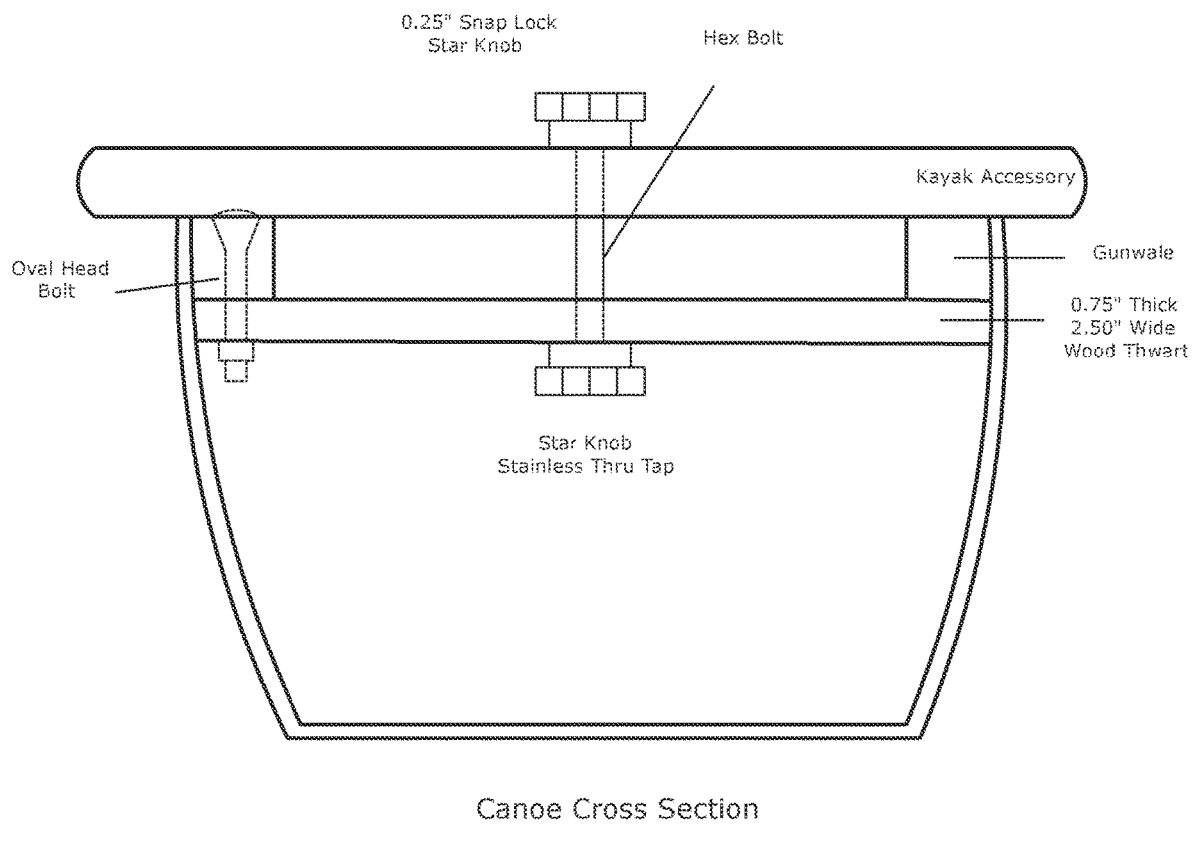
FIG. 40 illustrates a side view of mounting an accessory to a watercraft in accordance with an example embodiment.
Figure 41:
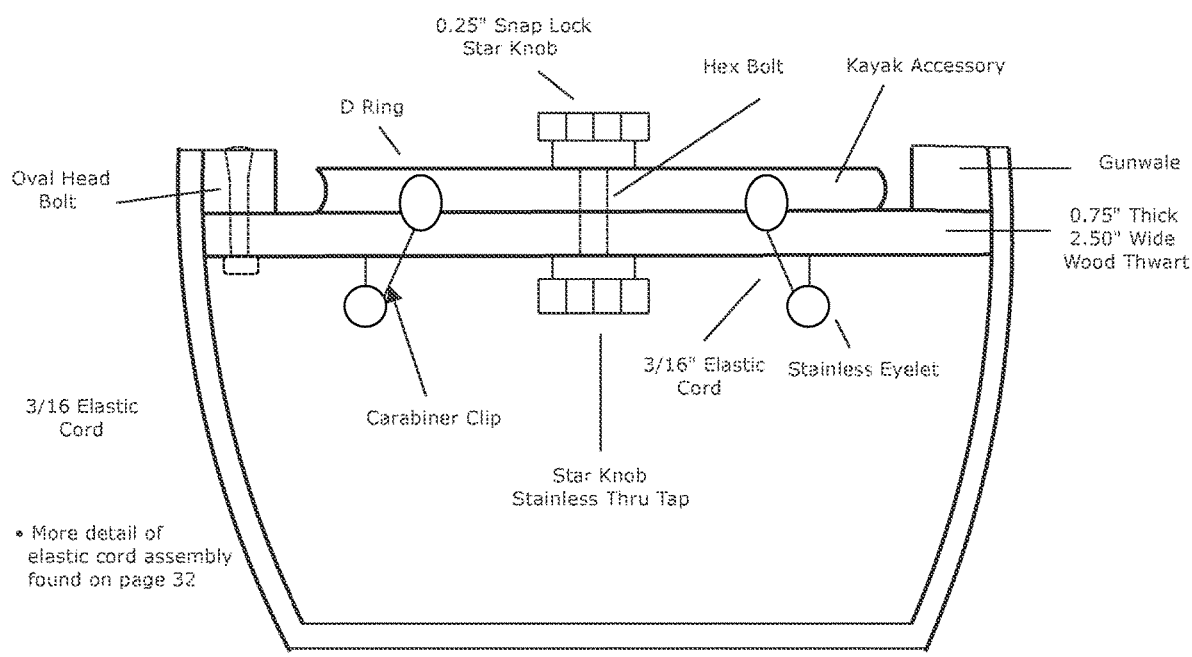
FIG. 41 illustrates a side view of mounting an accessory to a watercraft in accordance with an example embodiment.

Referring to FIGS. 38-41, the kayak accessory can be utilized in other boats, such as canoes. To assist in connecting the kayak accessory, a thwart can extend from one edge of the gunwale of the canoe to the other. The thwart can be connected to the two edges of the canoe via, e.g., bolts (see FIGS. 40-41). The accessory can connect to the thwart via a mounting fastener assembly (see FIGS. 40-41). Referring specifically to FIG. 38, the thwart can be connected to the canoe near the bow/stern thereof. Referring specifically to FIG. 39, the thwart can alternatively be connected to the canoe at a beam position thereof.

Figure 42:
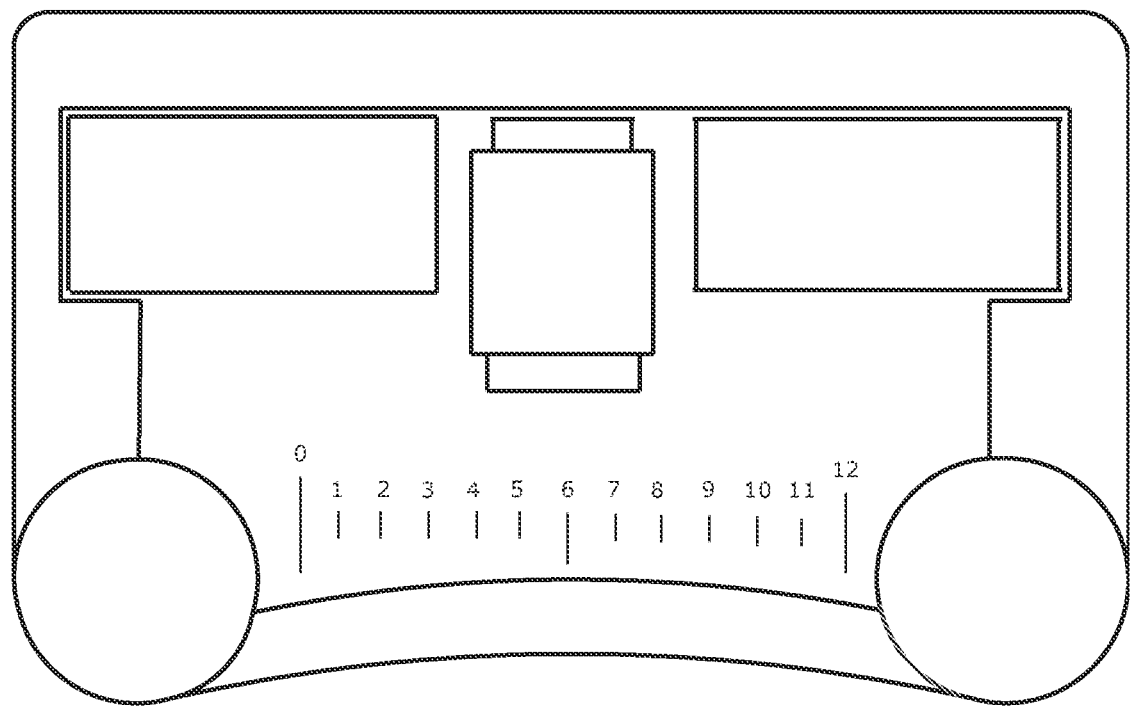
FIG. 42 illustrates a top view of a surface feature on an accessory in accordance with an example embodiment.

Referring to FIG. 42, the recessed platform space of the accessory can include graduations in the upper surface thereof. These graduations can be utilized by a user during kayaking. For example, the size of a caught fish can be measured using the graduations.

Figure 43:
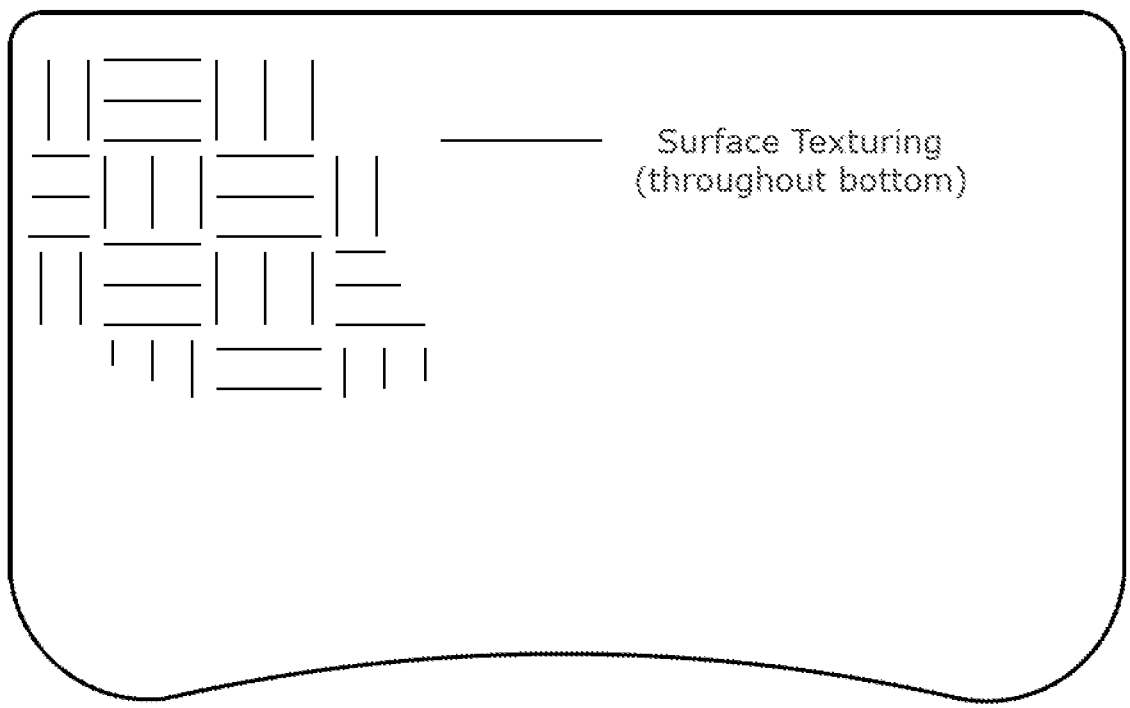
FIG. 43 illustrates a bottom view of a surface feature on an accessory in accordance with an example embodiment.

Referring to FIG. 43, the bottom surface of the accessory can include a textured surface for increasing friction.

The example kayak accessory described above contains approximately 125 square inches of useable flat platform space, which can be used for less valuable items such as small pieces of fishing equipment, bait, a meal, and snacks. It can also be a place for electronics.

The mounting rails of the kayak accessory help prevent items from rolling off the platform while in use. Being one inch thick, they are also intended to be an attachment platform. The user can further customize the kayak accessory for mounting various items in addition to fishing rod holders, such action cameras, a waterproof wireless (e.g., Bluetooth®) speaker, fish finder, transducer arm, and navigation lights.

The two water-proof compartments can be used to store items such as a cell phone, music player, compact camera, car keys, wallet, fishing lures, energy bars, whistle, etc. The cases have only one locking clasp, allowing the user to easily open and close with one hand. Each are located on both sides of the kayak accessory to help assure equal weight distribution.

The power bank can be a waterproof solar power bank. Thus, the power bank can be charged by sunlight and allows the kayaker to keep all their electronics charged during a long day on the water. It can also be manual charged by electricity, when not on the water. The power bank is easily attached by the two cinching elastic cords that are attached to the power bank cradles. Within seconds, the power bank can be easily secured onto the kayak accessory or removed.

Included with the kayak accessory are two surface mounted rod holders, one for each side. The accessory includes the rod mounts already attached to the side rails, the user simply inserts the holder into place. The holders are slightly elevated to give the rods additional clearance space to swivel into the desired position. The user can choose a combination of two fishing poles, or one pole and a fishing net. This importantly allows the fisherman to position the rod so that it is easily accessible and in a position that can be used while trolling.

The kayak accessory kit also includes a safety strap system. The user can install the eyelet screw in a location of their choice (likely the rear mounting rail) and connects the loop/coil/karabiner. This can offer the user added security for connecting valuable items, such as an action camera. It can also provide a convenient attachment point for small fishing tools, such as a line clipper.

The kayak accessory was designed to be easily installed, adjusted, and removed. One product can be removed from one kayak and installed on another. In the example shown in the figures, it is constructed from molded plastic, allowing its light weight to be manageable for all users and it is completely weatherproof. The rear of the product is shaped into an arch, so as to minimally obstruct kayak entry. All necessary hardware is included with the product. Multiple bolt lengths are included in the kit, to accommodate a variety of sizing needs.

Initial installation is intended to be completed only one time, on land. An example assembly method for the kayak accessory is set forth below.

To do an initial assembly of the front mount, a user can align the rear of the kayak accessory, so that it is aligned and centered in proximity with the front edge of the kayak cockpit. While seated in the kayak, the user can pull or push the product into a position so that it is about six inches from the torso of the user. With the kayak accessory held in place and centered, the user can make a guide mark, e.g. with a marker included in the kayak accessory kit, onto the kayak through the mounting slot, along the rear edge of the slot. The user can remove the accessory and make sure that the mark is centered with the kayak. Using, e.g. a drill with a 9/32 drill bit included with the kayak accessory kit, the user can drill a hole through the kayak, along the length of the mark. The user can place the mounting fastener assembly, e.g. the hex bolt through the snap lock star knob, so that the hex head is seated into the knob hex groove. Holding the star knob/bolt assembly under the newly created hole, the user can push the bolt through the kayak with the threads facing up. While holding the star knob/bolt assembly with one hand, the user can use the other hand to thread the serrated locking nut, onto the top of the kayak hull. The user can tighten the assembly permanently onto the kayak, taking caution not to overtighten.

To do an initial assembly of the side attachments, a user can measure back 12 inches from the frontmost end of the kayak cockpit along one side of the kayak cockpit rim. At a distance of 0.75" from the vertical edge of the cockpit (nearest the kayak interior), the user can use a drill, e.g. with an included 7/32 drill bit, to drill a hole into the kayak hull. The user can put a bolt through the attachment knob and into the newly drilled hole. The user can apply the lock nut onto the bottom of the bolt and permanently secure onto the hull, e.g. using a screwdriver and included hand wrench, to tighten the assembly, taking care not to overtighten. These steps can be repeated on the other side of the kayak to attach. With initial assembly completed, the user only has to do the following procedures, each time they want to install and remove the kayak accessory.

To attach the accessory via the front mount attachment, the user can remove the protective ball knob from the mounting bolt and feed the mounting bolt through the mounting slot of the kayak accessory. The user can then tighten the star knob onto the kayak accessory, so that the bolt is roughly centered in the slot.

To further attach the accessory via the side attachments, a user can loop one of the side attachment cords around the groove of the attachment knob. The user can engage the cord lock with one hand and pull both free ends of the cords with the other hand, to eliminate any slack. The user can overhand knot the free ends once, if preferred for additional security. If slight reach adjustments are necessary while on the water, the user can slightly untighten the star knob and adjust (by pulling or pushing the product) along the length of the mounting slot, as needed. The user can thereafter retighten the star knob.

As described above, the kayak accessory can also be adapted for use in a canoe. A separate kit could be provided for the retrofit. A thwart, e.g. a 36" wooden thwart, would be included with the kit and would be cut to size by the user, depending on the specific dimension of their canoe and desired location. The thwart can be bolted under the gunwales. There are two different types of locations that the kayak accessory can be installed on a canoe, using the thwart cross member.

At the bow/stern location of a canoe, the kayak accessory can fully or partially rest on top of the vessel's gunwale. With its weight being supported, only one attachment point is required. A hole can be drilled the center of the installed thwart. A stainless steel hex bolt can be inserted through a snap lock star knob, through the slot of the kayak accessory, through the drilled thwart hole, and into the threaded star knob stainless thru tap. A user can slide the bolt to the rear of the kayak accessory slot and hand tighten both knobs, making sure the hex head is seated in the snap lock star knob. The kayak accessory can easily be removed when not in use.

Regarding the beam location of canoe, this location will typically be wider than the kayak accessory, therefore it will not have the gunwale to rest upon. In addition to the above attachment procedure, additional attachment points are required. The retrofit kit can include two stainless steel eyelets are to be screwed into the bottom of the thwart. Each eyelet can be attached on opposite sides of the thwart, roughly ⅓ the distance from the ends. A provided aluminum carabiner can be attached to each side attachment cord and attached to the eyelet. The side attachment cord can be pulled through the cord lock until taught.

Although embodiments described herein are made with reference to example embodiments for kayaks and canoes, it should be appreciated by those skilled in the art that various modifications for other boats and the like are well within the scope and spirit of this disclosure. Therefore, the scope of the example embodiments is not limited herein. The disclosure is intended to include all such modifications and alterations disclosed herein or ascertainable herefrom by persons of ordinary skill in the art without undue experimentation.

The invention claimed is:

1. An accessory for providing storage for a watercraft comprising:

a base extending in a longitudinal direction having an upper side, a lower side, a front side, a rear side, a left side, and a right side; and a plurality of mounting rails extending along a perimeter of the upper side of the base along the front side, the rear side, the left side, and rear side thereof, the mounting rails projecting from the upper side of the base thereby defining a recessed platform space therebetween, wherein the accessory includes a mounting hole extending therethrough, the mounting hole configured to correspond with a mating hole in the watercraft, and a fastener provided through the mounting hole and configured to connect the accessory directly to the watercraft via the mating hole.

2. The accessory of claim 1, wherein the mounting slot extends through the recessed platform space of the base.

3. The accessory of claim 2, further comprising at least one power bank cradle coupled to the recessed platform space of the base near the mounting slot.

4. The accessory of claim 3, further comprising a power bank mounted to the at least one power bank cradle.

5. The accessory of claim 1, further comprising at least one cup holder projecting from the upper side of the base.

6. The accessory of claim 5, wherein the at least one cup holder includes a first cup holder located at a first corner of the base and a second cup holder located at a second corner of the base.

7. The accessory of claim 1, further comprising at least one hole extending through the recessed platform space.

8. An accessory for providing storage for a watercraft comprising:

a base extending in a longitudinal direction having an upper side, a lower side, a front side, a rear side, a left side, and a right side; and a plurality of mounting rails extending along a perimeter of the upper side of the base along the front side, the rear side, the left side, and rear side thereof, the mounting rails projecting from the upper side of the base thereby defining a recessed platform space therebetween, at least one hole extending through the recessed platform space, and a container having a through hole therein, wherein a fastener assembly extends through said hole through the recessed platform space and said through hole to connect the container to the base.

9. The accessory of claim 8, wherein the recessed platform form has a second hole and the container has a second through hole therein, wherein a second fastener assembly extends through the second hole of the recessed platform space and second through hole.

10. The accessory of claim 1, further comprising a rod holder attached to and projecting from a first mounting rail of the plurality of mounting rails.

11. The accessory of claim 10, wherein first mounting rail includes a narrow portion and a wide portion that is wider than the narrow portion, wherein the rod holder is attached to the wide portion of the first mounting rail.

12. The accessory of claim 10, further comprising a second rod holder attached to and projecting from a second mounting rail of the plurality of mounting rails.

13. The accessory of claim 1, further comprising a handle connected to the base.

14. A watercraft comprising the accessory of claim 1, comprising: a cockpit having a seat therein, the seat nearer to a first end of the cockpit than a second end thereof; a hole extending through a portion of the watercraft, wherein a mounting fastener assembly extends through the hole in the watercraft and through the mounting slot in the accessory to connect the accessory to the watercraft.

15. The watercraft of claim 14, the accessory further comprising a connecting ring connected to one of the plurality of mounting rails.

16. An accessory for providing storage for a watercraft comprising:

a base extending in a longitudinal direction having an upper side, a lower side, a front side, a rear side, a left side, and a right side; and a plurality of mounting rails extending along a perimeter of the upper side of the base along the front side, the rear side, the left side, and rear side thereof, the mounting rails projecting from the upper side of the base thereby defining a recessed platform space therebetween, an attachment knob projecting from the watercraft, and an elastic cord connected to both the attachment knob and at least one of the plurality of mounting rails to secure the accessory to the watercraft.

17. The watercraft of claim 16, the accessory further comprising a first connecting ring connected to the one of the plurality of mounting rails, the elastic cord connected to the mounting rail via the first connecting ring, and a second connecting ring connected to another of the plurality of mounting rails, the watercraft further comprising a second attachment knob, further comprising a second elastic cord connected to both the second connecting ring and the second attachment knob.

* * * * *